(12) United States Patent
Lin et al.

(10) Patent No.: US 12,434,329 B2
(45) Date of Patent: Oct. 7, 2025

(54) METAL JOINER SYSTEM, ASSOCIATED METHODS, AND PRODUCTS

(71) Applicant: Novelis Inc., Atlanta, GA (US)

(72) Inventors: Dechao Lin, Kennesaw, GA (US);
Dewei Zhu, Marietta, GA (US);
ChangOok Son, Marietta, GA (US);
Kyle Haines, Kennesaw, GA (US);
Louis Mitchell Nazro, Acworth, GA (US); Doug Keim, Phoenix, NY (US);
Curtis Eddie, Newton Falls, OH (US);
Devesh Mathur, Marietta, GA (US);
David Anthony Gaensbauer, Atlanta, GA (US)

(73) Assignee: Novelis Inc., Atlanta, GA (US)

( * ) Notice: Subject to any disclaimer, the term of this patent is extended or adjusted under 35 U.S.C. 154(b) by 204 days.

(21) Appl. No.: 17/305,351

(22) Filed: Jul. 6, 2021

(65) Prior Publication Data

US 2022/0001490 A1    Jan. 6, 2022

Related U.S. Application Data

(60) Provisional application No. 62/705,580, filed on Jul. 6, 2020.

(51) Int. Cl.
*B23K 26/24* (2014.01)
*B23K 26/042* (2014.01)
(Continued)

(52) U.S. Cl.
CPC ............ *B23K 26/24* (2013.01); *B23K 26/042* (2015.10); *B23K 26/06* (2013.01);
(Continued)

(58) Field of Classification Search
CPC ................................ B23K 26/24; B23K 26/38
See application file for complete search history.

(56) References Cited

U.S. PATENT DOCUMENTS

| 4,623,777 A | 11/1986 | Aihara et al. |
| 4,626,651 A | 12/1986 | Taniguchi et al. |

(Continued)

FOREIGN PATENT DOCUMENTS

| CN | 1152764 | 6/2004 |
| CN | 201735955 U | 2/2011 |

(Continued)

OTHER PUBLICATIONS

Translation of DE-102009055876-A1 (Year: 2011).*
(Continued)

*Primary Examiner* — Elizabeth M Kerr
(74) *Attorney, Agent, or Firm* — Kilpatrick Townsend & Stockton LLP

(57) ABSTRACT

A metal joiner system includes a power source and a metal joiner. The metal joiner includes a cleaning header, a cutting header, a joining header, and a joint finisher, each of which are communicatively coupled to the power source. The cutting header and cleaning header are configured to direct a first laser beam to prepare a joining region, and the joining header is configured to direct a second laser beam to form a joint in the joining region. A method of joining a metal substrates includes forming a joining region in abutting metal substrates, directing the first laser beam onto the joining region in a joint preparation stage, and directing the second laser beam onto the joining region to form a weld. A product of a metal joiner, a weld, has a portion of weld metal removed at the weld start and the weld crater regions.

19 Claims, 19 Drawing Sheets

(51) Int. Cl.
  *B23K 26/06* (2014.01)
  *B23K 26/08* (2014.01)
  *B23K 26/142* (2014.01)
  *B23K 26/361* (2014.01)
  *B23K 103/04* (2006.01)
  *B23K 103/10* (2006.01)

(52) U.S. Cl.
  CPC ........ *B23K 26/0892* (2013.01); *B23K 26/142* (2015.10); *B23K 26/361* (2015.10); *B23K 2103/04* (2018.08); *B23K 2103/10* (2018.08)

(56) References Cited

U.S. PATENT DOCUMENTS

| | | | |
|---|---|---|---|
| 4,840,303 | A | 6/1989 | Fujii et al. |
| 4,870,244 | A * | 9/1989 | Copley .............. B23K 26/0604 |
| | | | 219/121.61 |
| 5,190,204 | A | 3/1993 | Jaeck et al. |
| 5,229,571 | A | 7/1993 | Neiheisel |
| 5,614,112 | A | 3/1997 | Peru et al. |
| 6,476,344 | B1 | 11/2002 | Fields, Jr. et al. |
| 6,803,538 | B2 | 10/2004 | Wright et al. |
| 7,842,900 | B2 | 11/2010 | Longfield et al. |
| 8,445,811 | B2 | 5/2013 | Barjon et al. |
| 10,668,570 | B2 | 6/2020 | Schmit et al. |
| 11,389,894 | B2 | 7/2022 | Brescoe et al. |
| 2010/0140234 | A1 * | 6/2010 | Alber ................. B23K 26/0876 |
| | | | 219/121.64 |
| 2016/0167169 | A1 | 6/2016 | Khare et al. |
| 2017/0120391 | A1 * | 5/2017 | Schmit ................... B23K 26/40 |
| 2017/0304904 | A1 * | 10/2017 | Kato ....................... B23K 26/03 |
| 2017/0312853 | A1 | 11/2017 | Kabelitz et al. |
| 2018/0221989 | A1 * | 8/2018 | Matsuoka ............. B23K 26/082 |

FOREIGN PATENT DOCUMENTS

| | | | |
|---|---|---|---|
| CN | 102649193 | | 4/2015 |
| CN | 105643111 | | 12/2017 |
| CN | 107824972 | A | 3/2018 |
| DE | 10322449 | B3 | 6/2004 |
| DE | 102009055876 | | 6/2011 |
| DE | 102009055876 | A1 * | 6/2011 ............. B23K 26/32 |
| EP | 1157753 | | 11/2001 |
| JP | H04367384 | | 12/1992 |
| JP | H05-123878 | A | 5/1993 |
| JP | 2000158162 | A | 6/2000 |
| JP | 2016132007 | A | 7/2016 |
| JP | 2017514694 | A | 6/2017 |
| RU | 2158661 | C2 | 11/2000 |

OTHER PUBLICATIONS

International Application No. PCT/US2021/070821 , "International Preliminary Report on Patentability", Mailed on Jan. 19, 2023, 14 pages.
Application No. PCT/US2021/070821 , International Search Report and Written Opinion, Mailed On Feb. 4, 2022, 20 Pages.
PCT/US2021/070821 , "Invitation to Pay Additional Fees And, Where Applicable Protest Fee", Dec. 9, 2021, 6 pages.
JP Application No. 2022-580952, "Office Action", mailed on Dec. 19, 2023, 15 pages.
CA Application No. 3,187,006 , "Office Action", May 1, 2024, 6 pages.
EP Application No. 21751731.7 , "Office Action", Mar. 6, 2024, 6 pages.
CN Application No. 202180048734.5, "Office Action", Jun. 28, 2024, 22 pages.
JP Application No. 2022-580952, "Office Action", Jun. 11, 2024, 12 pages.
EP Application No. 21751731.7 , "Office Action", Aug. 29, 2024, 5 pages.
JP Application No. 2022-580952 , "Notice of Decision to Grant", Oct. 22, 2024, 4 pages.
KR Application No. 10-2022-7044888 , "Office Action", Sep. 30, 2024, 27 pages.
CN Application No. 202180048734.5 , "Office Action", Dec. 23, 2024, 15 pages.
Chinese Patent Application No. 202180048734.5, "Office Action", Apr. 23, 2025, 7 pages.
European Patent Application No. 21751731.7, "Summons to Attend Oral Proceedings", Feb. 27, 2025, 8 pages.
CN Application No. 202180048734.5, "Notice of Decision to Grant", Jul. 29, 2025, 3 pages.
EP Application No. 21751731.7, "Intention to Grant", Jul. 16, 2025, 11 pages.
KR Application No. 10-2022-7044888, "Notice of Decision to Grant", Jun. 25, 2025, 6 pages.

* cited by examiner

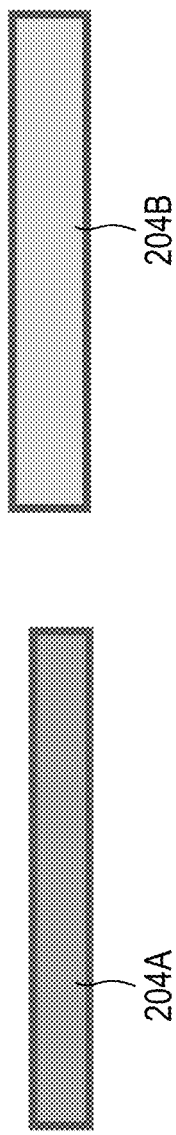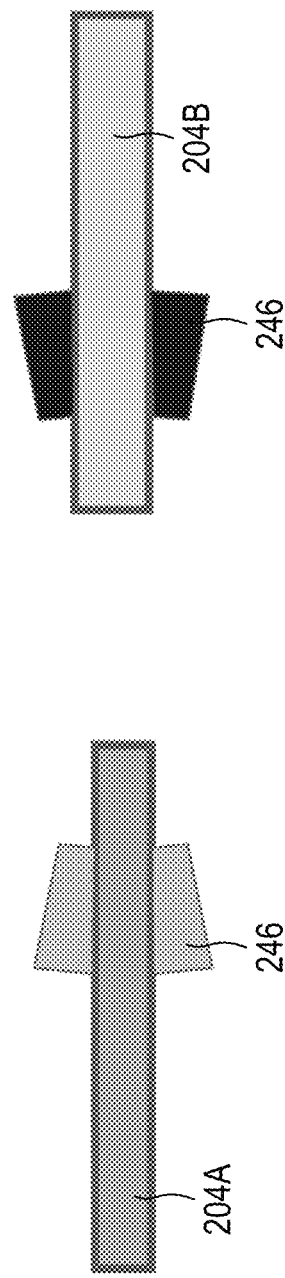

METAL JOINER SYSTEM, ASSOCIATED METHODS, AND PRODUCTS

REFERENCE TO RELATED APPLICATION

This application claims the benefit of U.S. Provisional Patent Application No. 62/705,580, filed on Jul. 6, 2020, and entitled METAL JOINER SYSTEM, ASSOCIATED METHODS, AND PRODUCTS, the content of which is hereby incorporated by reference in its entirety.

FIELD OF THE INVENTION

This application relates to metal processing, and, more specifically, to systems and methods for joining metal substrates together.

BACKGROUND

Metal processing may sometimes include joining two (or more) metal substrates together with a joint. As one example, a joining process may be used to join two coils of metal sheet together. Such joining processes are sometimes mechanical joining processes in continuous aluminum coil processing that include sheet overlapping, local sheet cutting, bending, and placing a metal insert between adjacent edges of the two metal sheets to join the metal sheets together. With such processes, it may be difficult to join thin gauge sheets together due to the size of the metal insert or the strength without the insert. It may likewise be difficult to join thicker gauge sheets together because the inserts may come out during subsequent processing. For example, the cut edges for the inserts may stick to a nearby roller, which in turn may negatively affect the surface quality of the metal sheets. When the mechanical joint goes through chemical processing for surface treatment, any hidden chemical residues remaining at the mechanical joint gaps may negatively affect the sheet surface quality. In addition, the metal inserts increase the metal thickness at the joint, which may require equipment that processes the joint downstream to be subsequently adjusted to account for the increased metal thickness. For example, when a joint with an increased thickness goes through a tension level roll, the tension level rolls may need to be lifted so that the thicker joint can go through the tension leveler and subsequently closed after the joint passes the tension leveler. In such a scenario, the length of the metal substrate that is not worked by the tension level rollers (because they were lifted) will need to be cut off to ensure the required quality of the metal substrate is met.

SUMMARY

Embodiments covered by this patent are defined by the claims below, not this summary. This summary is a high-level overview of various embodiments and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to some embodiments, a metal joiner system includes a power source and a metal joiner. The metal joiner includes a cutting header and a joining header connected to the cutting header such that the joining header moves with the cutting head. The cutting header is communicatively coupled to the power source and prepares a joining region for formation of a joint by directing a first laser beam from the metal joiner onto the joining region. The joining header is communicatively coupled to the power source and forms the joint in the joining region by directing a second laser beam from the metal joiner onto the joining region. In some embodiments, at least one characteristic of the second laser beam is different from the first laser beam.

In some embodiments, the metal joiner may also include a cleaning header and/or a joint finisher. The cleaning header may be positioned on a bottom of the metal substrates and may remove contaminations from the bottom, including, but not limited to oil, lubricant, dust, dirt, etc. In certain examples, the cutting header is positioned on the top of the metal substrates. In various examples, the cleaning header and the cutting header may be operated or run separately for preparation of the joining region. The joint finisher may be positioned to remove a portion of the weld metal at a weld start, a weld crater, and/or other weld defects.

According to certain embodiments, a metal joiner for a metal joiner system includes a cutting header and a joining header connected to the cutting header such that the joining header moves with the cutting head. The cutting header prepares a joining region for forming a joint by directing a first laser beam from the metal joiner onto the joining region. The joining header forms the joint in the joining region by directing a second laser beam from the metal joiner onto the joining region. In some examples, at least one characteristic of the second laser beam is different from the first laser beam.

In various embodiments, the metal joiner may also include a cleaning header and/or a joint finisher. In certain examples, a leading cleaning header may be connected to both the cutting header and a trailing joining header and moves at a same running speed. In such embodiments, the cleaning header, the cutting header, and the joining header may run simultaneously at a same travel speed. In some embodiments, the cutting header with the leading cleaning header attached prepares the joining region. The joint finisher may be positioned to remove a portion of the weld metal at a weld start, a weld crater, and/or other weld defects.

According to some embodiments, a metal joiner for a metal joiner system includes a cutting header that prepares a joining region for forming a joint by directing a first laser beam from the metal joiner onto the joining region. The metal joiner also includes a joining header that forms the joint in the joining region by directing a second laser beam from the metal joiner onto the joining region. In certain embodiments, at least one characteristic of the second laser beam is different from the first laser beam. In various examples, the metal joiner is movable along a travel path during a metal joining process, and the joining header is connected to the cutting header such that the joining header is downstream from the cutting header along the travel path.

In certain embodiments, the metal joiner also includes a cleaning header that removes contaminations from the bottom of the metal substrates, including but not limited to oil, lubricant, dust, dirt, etc. In some embodiments, the cutting header is positioned above the top of the metal substrates. In some aspects, the cleaning header may be a leading component and the cutting header may be a trailing component, and the leading cleaning header and the trailing cutting header may run simultaneously at the same travel speed.

According to various embodiments, a method includes aligning an end edge of a first metal substrate with a start edge of a second metal substrate such that an edge surface of the end edge abuts an edge surface of the start edge. In certain embodiments, the alignment is optionally less than or equal to 10% of the thickness of the metal substrate. As a non-limiting example, a 2 mm thick metal substrate may have an alignment within 0.2 mm. In various embodiments, bottom surfaces of the first metal substrate and the second metal substrate are optionally substantially aligned level (e.g., within 10% of the minimum gauge) when aligned.

The aligned end edge and the start edge together define a joining region. The method includes preparing the joining region for joining by directing a first laser beam onto the joining region with a cutting head. The method also includes directing a second laser beam onto the joining region with a joining header to form a weld. At least one characteristic of the first laser beam is different from the second laser beam. Forming the weld joins the first metal substrate with the second metal substrate.

In some embodiments, the method may also include directing a cleaning process onto the joining region with a cleaning header position on the bottom of the metal substrates. The method may also include preparing the joining region for joining by directed the first laser beam from the cutting header position on the top of the metal substrates. The method may also include directing a joint finisher onto the joining region to remove a portion of the weld metal at the weld start, weld crater, and/or other weld defects.

According to some embodiments, a weld joins a first metal substrate with a second metal substrate. The weld includes a top weld surface and a bottom weld surface. In some examples, the top weld surface is recessed relative to a top surface of the first metal substrate and relative to a top surface of the second metal substrate, and the bottom weld surface is recessed relative to a bottom surface of the first metal substrate and relative to a bottom surface of the second metal substrate.

In various embodiments, the first metal substrate and the second metal substrate may have a same thickness or different thicknesses. In certain embodiments, the weld joins the first metal substrate with the second metal substrate. The weld includes a top weld surface and a bottom weld surface. In some examples, the top weld surface is thicker relative to a top surface of the first metal substrate and relative to a top surface of the second metal substrate, and the bottom weld surface is thicker relative to a bottom surface of the first metal substrate and relative to a bottom surface of the second metal substrate. The extra weld metal thickness beyond the top surface of the first metal substrate and the top of the second metal substrate is optionally not greater than 0.2 mm and/or 10% of thickness of both the first metal substrate and the second metal substrate. The extra weld metal thickness beyond the bottom surface of the first metal substrate and the bottom of the second metal substrate is optionally not greater than 0.2 mm and/or 10% of thickness of both the first metal substrate and the second metal substrate.

According to certain embodiments, a weld joins a first metal substrate with a second metal substrate. The weld includes a weld thickness, and the weld thickness transitions from a thickness of the first metal substrate to a thickness of the second metal substrate. In some embodiments, the weld thickness is optionally less than at least one of the thickness of the first metal substrate or the thickness of the second metal substrate.

In some embodiments, the first metal substrate and the second metal substrate have the same thickness or dissimilar thicknesses. In various embodiments, the weld thickness is optionally greater than one of the thickness of the first metal substrate or the thickness of the second metal substrate. In certain embodiments, the weld joins the first metal substrate with the second metal substrate regardless of their same or dissimilar gauges. In some examples, a portion of the weld metal is removed at the weld start, weld crater, and/or other weld metal defect locations.

Various implementations described herein can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

FIG. 8 is an end view of metal substrates during an input stage of the method of FIG. 7 according to embodiments.

FIG. 9 is an end view of the metal joiner system of FIG. 6 during a securing stage of the method of FIG. 7 according to embodiments.

DETAILED DESCRIPTION

Figure 1:
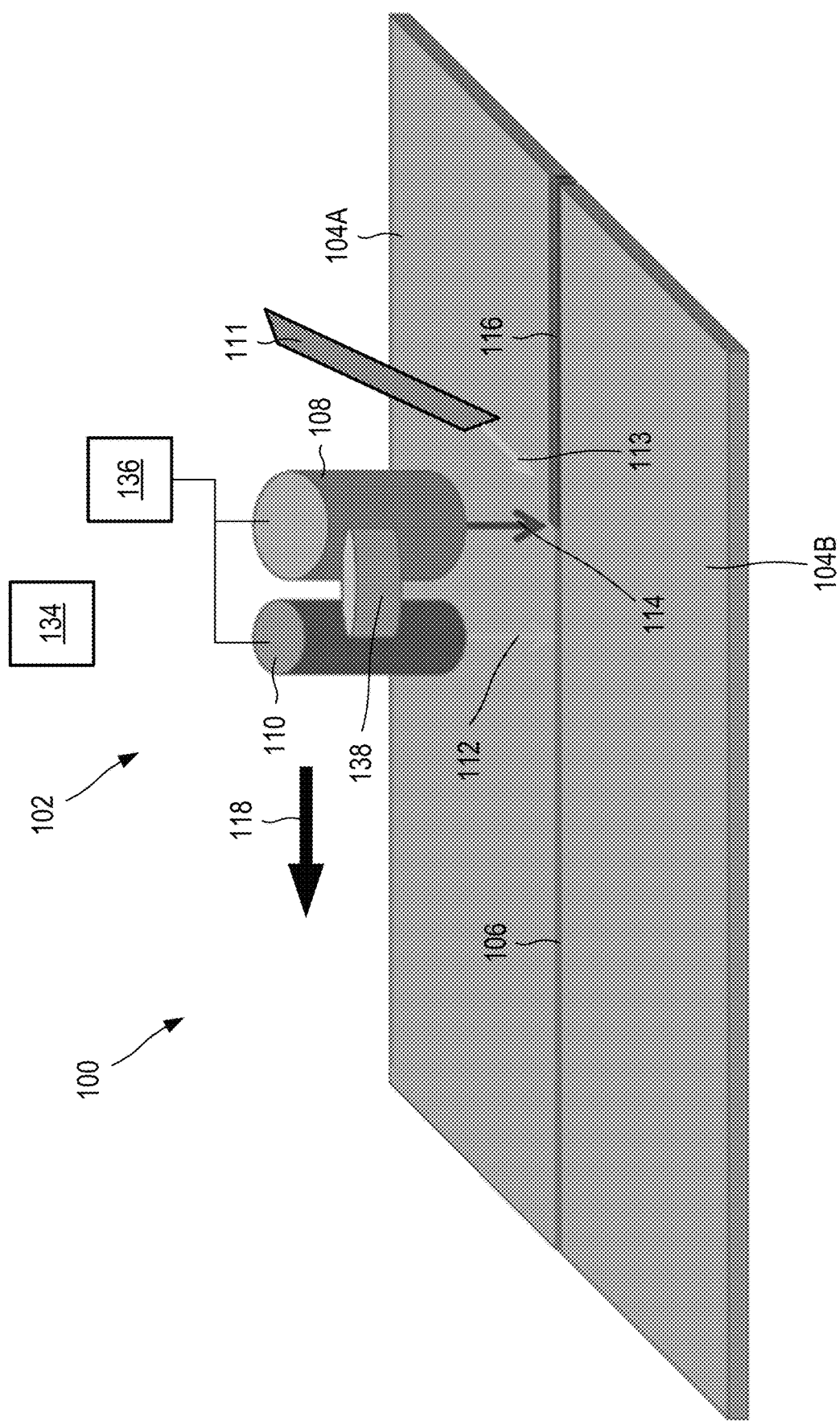
FIG. 1 illustrates a metal joiner system with a metal joiner having a cutting header and a joining header according to embodiments.

The subject matter of embodiments is described herein with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing.

In this description, reference is made to alloys identified by aluminum industry designations, such as "series" or "7xxx." For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

Described herein is a metal joiner system for joining two (or more) metal substrates together. In some embodiments, the metal substrates may be subjected to a shear cut or mechanical cut before the metal joiner system. The metal joiner system may be used to join any suitable metal substrates, however it may be especially useful for joining metal substrates that are aluminum and/or aluminum alloys, as well as steel and/or steel alloys. In various non-limiting examples, the metal substrates may include aluminum and aluminum alloys including, but not limited to 1xxx series aluminum alloys, 2xxx series aluminum alloys, 5xxx series aluminum alloys, 4xxx series aluminum alloys, 5xxx series aluminum alloys, 6xxx series aluminum alloys, 7xxx series aluminum alloys, and/or 8xxx series aluminum alloys, and/ or various other types of metal materials. As another non-limiting example, in certain embodiments, the metal substrates may include steel, high-strength steel used in automotive industry, including but not limited to carbon steel, dual phase steel, and/or advanced high strength steel. In certain non-limiting examples, a gauge or thickness of each metal substrate may be from 0.3 mm to 6 mm, although various other gauges within this range or outside of this range may be utilized. The metal substrates may be the same material (e.g., the same aluminum alloy) or dissimilar materials (e.g., two different aluminum alloys). The metal substrates have the same gauge or may have dissimilar gauges as desired such that the weld or joint may be formed between metal substrates having the same thickness or dissimilar thicknesses. In some embodiments, the metal substrates may be metal sheets, although they need not be sheets in other examples. In some non-limiting examples, the metal joiner system may be utilized to join two metal coils together.

The metal joiner system includes a metal joiner having a cutting header and a joining header. The metal joiner may also include a cleaning header and/or a joint finisher. The metal joiner system may include a power source that is communicatively coupled to the cutting header and the joining header. The metal joiner system may also include a controller that is communicatively coupled with the metal joiner and that may control the metal joiner during a joining process that includes a preparation stage, a joining stage, and/or a weld finish stage. In various aspects, the joiner header is connected to the cutting header such that the joining header moves with the cutting header during the joining process. In various aspects, the cutting header is connected to a cleaning header such that the cutting header moves with the cleaning header during the cutting process at the preparation stage, although it need not in other examples.

In certain examples, during the preparation stage of the joining process, the cutting header may prepare a joining region for formation of a joint by directing a first laser beam onto the joining region. In some examples, the controller controls the cutting header during the preparation stage such that the first laser beam forms a gap between faying edges of a first metal substrate and a second metal substrate. Additionally or alternatively, the controller may also control the cutting header during the preparation stage such that the first laser beam is directed onto top and bottom surfaces of the first metal substrate and the second metal substrate to remove contaminants such as lubricants, grease, fingerprints, etc. and/or otherwise prepare the top and bottom surfaces for formation of the joint.

In various examples, during the joining stage of the joining process, the joining header may form a joint (also referred to as a weld) by directing a second laser beam onto the joining region. The second laser beam may have at least one characteristic that is different from the first laser beam, including, but not limited to, a beam size, a beam intensity, a beam pattern, and/or other suitable characteristics as desired. In some embodiments, the controller controls the joining header such that the second laser beam heats a portion of the joining region and forms a weld. In certain aspects, the controller controls the joining header such that the second laser beam forms a weld having a thickness that is less than a thickness of the metal substrate(s) forming the joining region. In various aspects, the controller controls the joining header such that the second laser beam forms a weld that is recessed relative to a top surface of the metal substrate(s) forming the joining region and/or recessed relative to a bottom surface of the metal substrate(s) forming the joining region. In various aspects, the controller controls the joining header such that the second laser beam forms a weld that has an extra thickness at the weld metal relative to a top surface of the metal substrate(s) forming the joining region and/or extra thickness relative to a bottom surface of the metal substrate(s) forming the joining region. The extra weld metal thickness beyond the top surface of the first metal substrate and the top of the second metal substrate is optionally not greater than 0.2 mm or 10% of thickness of both the first metal substrate and the second metal substrate. The extra weld metal thickness (weld reinforcement) beyond the bottom surface of the first metal substrate and the bottom of the second metal substrate is optionally not greater than 0.2 mm or 10% of thickness of both the first metal substrate and the second metal substrate.

The metal joiner system described herein may improve a speed at which a joint is formed between two metal substrates because a single metal joiner may both prepare a joining area for the joint and form the joint. In some embodiments, the metal joiner system described herein may operate at a welding speed of at least 3 meters per minute. In some cases, the metal joiner system described herein may operate at a welding speed of up to 20 meters per minute. In further embodiments, the metal joiner system may operate at a welding speed of 60 meters per minute. Additionally, the metal joiner of the metal joiner system may improve the quality of the surface of the metal substrate by utilizing the first laser beam and the second laser beam. The metal joiner system may also minimize or reduce metal loss when using a joining process and/or subsequent processing of the joined metal substrates. For example, the laser beams used to cut and form the joint may create minimal debris and/or loss of metal substrate to form the joint. Additionally, because the welds formed by the metal joiner system have a reduced thickness, subsequent processing does not have to be stopped or otherwise account for a thicker joint section that would otherwise be present in existing mechanical joining (e.g., because of excessive weld reinforcements greater than 0.2 mm or 10% of metal substrate thickness). The metal joiner systems described herein may also allow for the formation of a joint between metal substrates without requiring a chemical solvent. In certain aspects, the process may have a reduced processing time because the preparation and joining are done in close succession.

Figure 2:
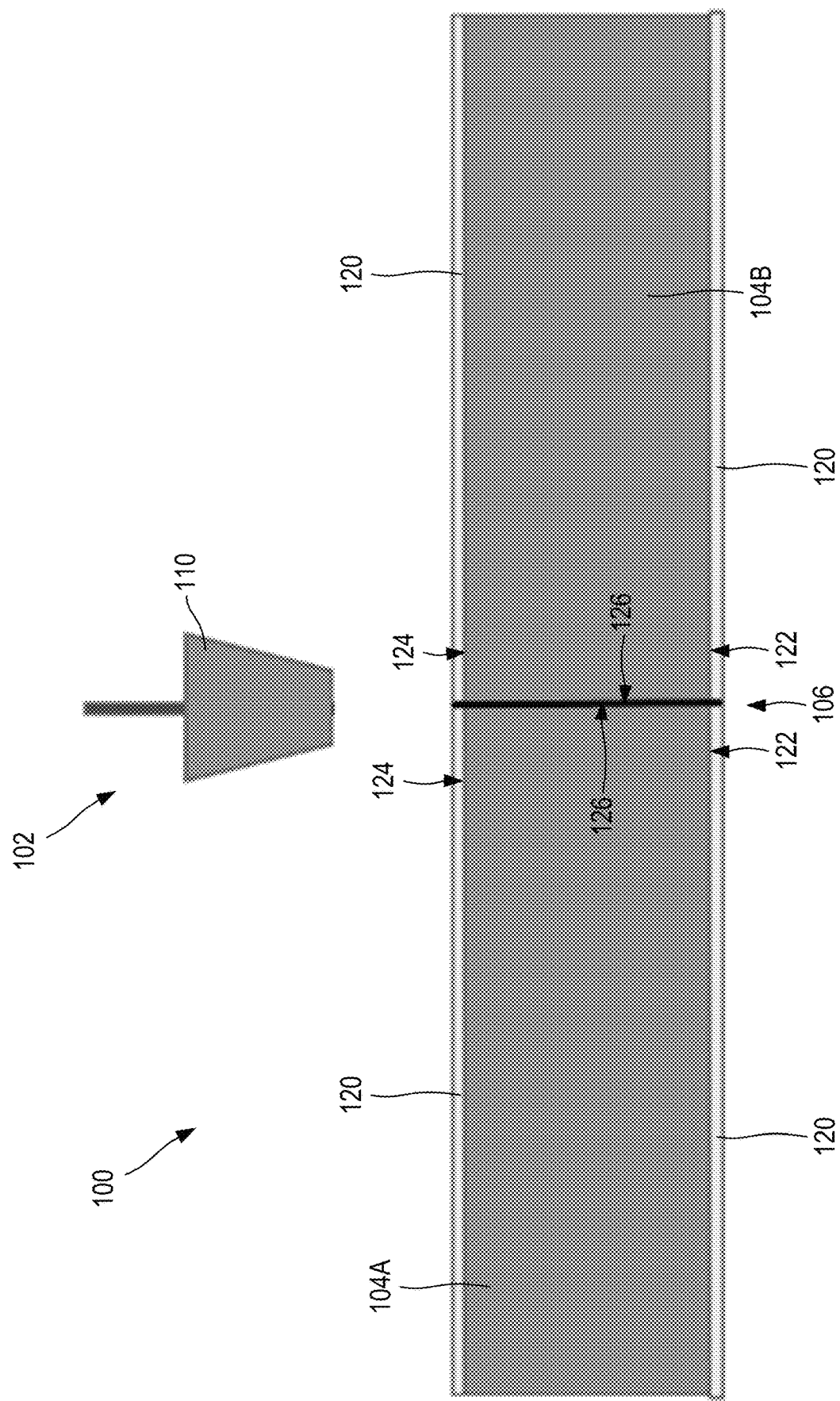
FIG. 2 illustrates the metal joiner system of FIG. 1 prior to a joining process with the metal joiner.
Figure 3:
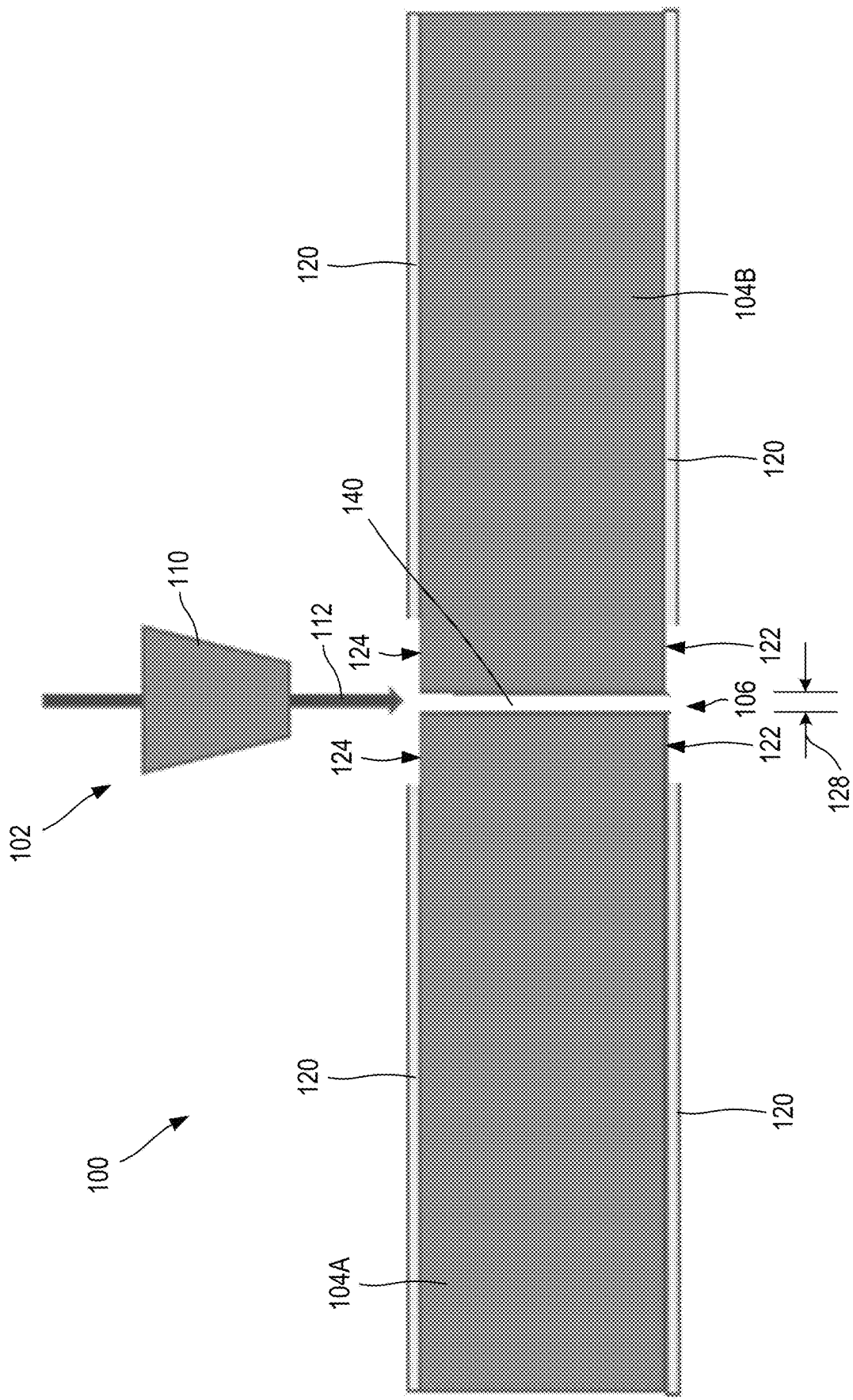
FIG. 3 illustrates the metal joiner of the processing system of FIG. 1 during a preparation stage of the joining process according to embodiments.
Figure 4:
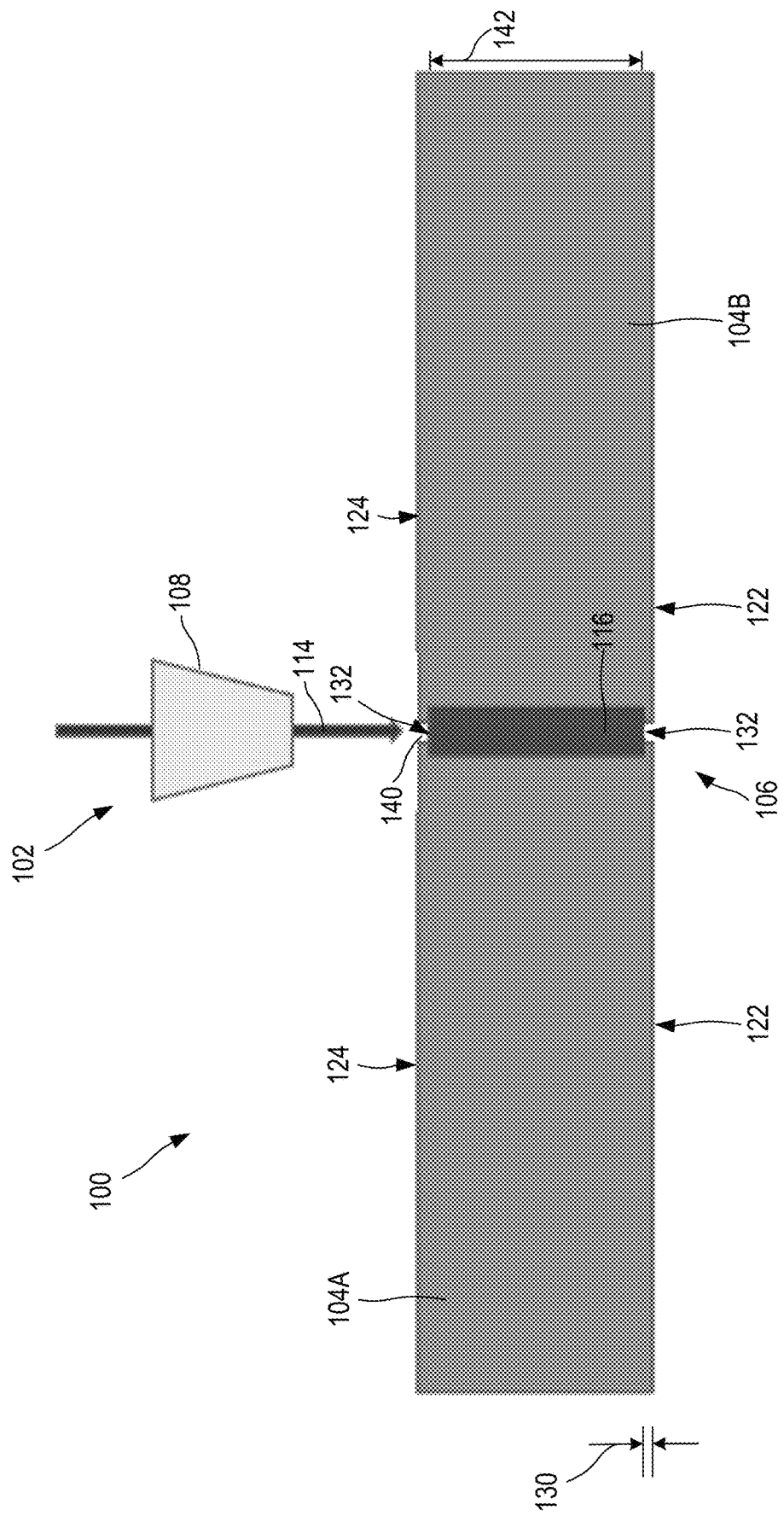
FIG. 4 illustrates the metal joiner of FIG. 1 during a joining stage of the joining process according to embodiments.

FIG. 1 illustrates an example of a metal joiner system 100 according to various embodiments, and FIGS. 2-4 illustrate the metal joiner system 100 during various stages of a joining process. The metal joiner system 100 includes a metal joiner 102 that selectively forms a weld 116 in a joining region 106 that joins a first metal substrate 104A with a second metal substrate 104B. The metal joiner system 100 may also include a power source 136 and a controller 134.

The first metal substrate 104A and the second metal substrate 104B may be various suitable metals as desired, and the metal of the first metal substrate 104A need not be the same as the metal of the second metal substrate 104B. In various examples, the first metal substrate 104A may be a portion of a first coil of a metal substrate and the second metal substrate 104B may be a portion of a second coil of a metal substrate. Various suitable metals for the first metal substrate 104A and/or the second metal substrate 104B may include, but are not limited to, aluminum, aluminum alloys, steel, stainless steel, or other metals as desired. As best illustrated in FIGS. 2-4, the first metal substrate 104A and the second metal substrate 104B each include a top surface 124, a bottom surface 122, and an edge surface 126 extending between the top surface 124 and the bottom surface 122.

As discussed in detail below, in various aspects, the joining region 106 may include at least a portion of the top surfaces 124, at least a portion of the bottom surfaces 122, and the edge surfaces 126.

In some examples, and as illustrated in FIGS. 2 and 3, a coating 120 (or other contaminants) may be on portions of one or more of the top surfaces 124, the bottom surfaces 122, or the edge surfaces 126. In some embodiments, the coating 120 may be purposefully provided on the surfaces or may be provided on the surfaces as a byproduct of prior handling or processing. As some examples, the coating 120 may be contaminants for the joining process such as grease, lubricant, fingerprints, dust, dirt, oil, etc. As discussed in detail below, during the joining process, the metal joiner system 100 may at least partially remove some of the coating 120, which may improve formation of the weld 116 and improve the surface quality of the metal substrate(s).

Referring to FIG. 1, the metal joiner 102 includes a cutting header 110 and a joining header 108. In various aspects, the cutting header 110 is communicatively coupled with the power source 136 such that the power source 136 powers the cutting header 110 and the cutting header 110 can direct a first laser beam 112 onto the joining region 106 during the joining process. Similarly, the joining header 108 is communicatively coupled with the power source 136 such that the power source 136 powers the joining header 108 and the joining header 108 can direct a second laser beam 114 onto the joining region 106 during the joining process. In various aspects, at least one characteristic of the first laser beam 112 from the cutting header 110 may be different from the second laser beam 114 from the joining header 108. In certain embodiments, the at least one characteristic may include, but is not limited to, a beam intensity, a beam size, or a pattern of the beam directed onto the joining region 106. In some non-liming examples, the beam size of the first laser beam 112 is less than the beam size of the second laser beam 114.

The joining header 108 is connected to the cutting header 110 such that the joining header 108 moves with the cutting header 110. Optionally, the joining header 108 is connected to the cutting header 108 such that as the metal joiner 102 moves in a travel direction 118, the portion of the joining region 106 at which the joining header 108 directs the second laser beam 114 onto is substantially the same as the portion of the joining region 106 at which the cutting header 110 directs the first laser beam 112. In the example of FIG. 1, a support 138 connects the joining header 108 with the cutting header 110; however, in other examples, various other suitable devices or mechanisms may connect the joining header 108 with the cutting header 110 such that the joining header 108 moves with the cutting header 110. In various aspects, the joining header 108 connected to the cutting header 110 may allow a single power source to be utilized. The connected headers may also require less time to set up and calibrate the metal joiner 102 compared to existing joiner systems because a single set up and calibration step may optionally be utilized. The connected headers of the metal joiner 102 may also allow for the metal joiner 102 to complete the joining process without requiring operator intervention.

The controller 134 is communicatively coupled with the joining header 108 and the cutting header 110. The controller 134 may optionally be communicatively coupled with the power source 136. As discussed in detail below, the controller 134 may selectively control the metal joiner 102 during the joining process.

The controller 134 can include one or more of a general purpose processing unit, a processor specially designed for joining control analysis and/or metal joining applications, a processor specially designed for wireless communications (such as a Programmable System On Chip from Cypress Semiconductor), or other suitable processors. A memory may be provided with the controller 134, although it need not in other examples. When included, the memory may include a long-term storage memory and/or a short-term working memory, and the memory may be used by the controller 134 to store a working set of processor instructions (i.e., the processor may write data to the memory). In some aspects, the memory could include a disk based storage device and/or one of several other type of storage mediums including but not limited to a memory disk, USB drive, flash drive, remotely connected storage medium, virtual disk drive, or the like. Various other features including, but not limited to, a communication circuit/unit, an optional display, an optional speaker, and/or power storage unit may also be included in the controller 134. In some aspects, some or all of the components of the controller 134 may be included together in a single package or sensor suite, such as within the same enclosure. In additional or alternative aspects, some of the components may be included together in an enclosure and the other components may be separate (i.e., the controller 134 may be a distributed system). Other configurations of the controller 134 may be utilized as desired. In various aspects, the controller 134 communicates data with the joining header 108 and the cutting header 110 to control at least one of a position or orientation of the metal joiner 102 relative to the joining region 106, the first laser beam 112, the second laser beam 114, a welding speed of the metal joiner 102, a size of a gap formed during the preparation stage of the joining process, a thickness of a weld formed by the metal joiner 102 during the joining stage of the joining process, combinations thereof, or other suitable features of the metal joiner system 100 as desired during the joining process.

Optionally, and as illustrated in FIG. 1, the metal joiner system 100 may include a shielding gas nozzle 111. In certain embodiments, the shielding gas nozzle 111 may provide a shielding gas 113 to the side of the weld 116. When included, the shielding gas nozzle 111 may optionally not block any weld quality monitoring and/or scanning. The shielding gas nozzle 111 may be connected to the joining header 108 and/or the cutting header 110, although it need not in other embodiments. In other embodiments, the shielding gas nozzle 111 may be omitted.

Figure 5:
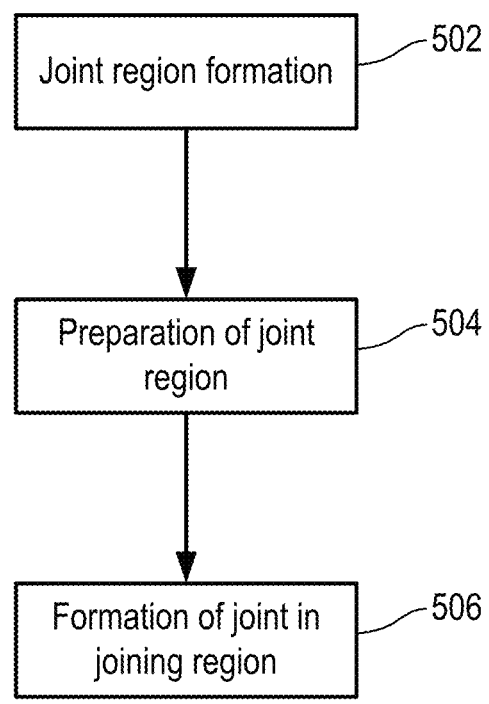
FIG. 5 is a flow chart of a method of joining metal substrates with the metal joiner system of FIG. 1 according to embodiments.

FIG. 5 illustrates various stages of a joining process of joining the first metal substrate 104A with the second metal substrate 104B with the metal joiner system 100, and FIGS. 2-4 illustrate the metal joiner system 100 during the various stages.

Referring to block 502 and FIG. 5, a joint region formation stage of the joining process may include positioning the first metal substrate 104A relative to the second metal substrate 104B to form the joining region 106. In some embodiments, and as illustrated in FIG. 2, forming the joining region 106 may include positioning the first metal substrate 104A relative to the second metal substrate 104B such that the edge surface 126 of the first metal substrate 104A abuts the edge surface 126 of the second metal substrate 104B. Optionally, block 502 may include initially positioning the metal joiner 102 relative to the joining region 106. In various aspects, initially positioning the metal joiner 102 may include positioning the metal joiner 102 such that the metal joiner 102 is substantially aligned with the faying edge surfaces 126. In some embodiments, the metal joiner 102 may be initially positioned above the top surfaces 124 of the metal substrates 104A-B, although in other examples the metal joiner 102 may be initially positioned below the bottom surfaces 122 of the metal substrates 104A-B.

Referring to block 504 of FIG. 5 and FIG. 3, a preparation stage of the joining process may include preparing the joining region 106 for the formation of the joint with the cutting header 110 of the metal joiner 102. In various examples, the controller 134 controls the cutting header 110 to direct the first laser beam 112 onto the joining region 106. In various embodiments, the controller 134 controls the cutting header 110 to direct the first laser beam 112 such that the first laser beam 112 cuts the portions of the first metal substrate 104A and the second metal substrate 104B proximate to the edge surfaces 126 and forms a gap 140 between the first metal substrate 104A and the second metal substrate 104B. In certain aspects, the controller 134 controls the cutting header 110 such that gap 140 formed by the first laser beam 112 has a gap width 128 of less than or equal to about 0.5 mm, such as less than or equal to about 0.4 mm, such as less than or equal to about 0.3 mm, such as less than or equal to about 0.2 mm, such as less than or equal to about 0.1 mm. In other embodiments, the gap width 128 may optionally be greater than 0.4 mm, such as greater than 0.5 mm, and/or at any other gap width 128 as desired. In certain aspects, the cutting header 110 is controlled to produce a rough (high speed) laser cut, which may produce microvoids when the metal substrates 104A-B are placed together. In such examples, molten metal (produced by the laser of the joining header 108) wicks into these voids during welding, and the voids themselves contribute to the thickness of the weld being about the same as or less than the metal substrates. In some embodiments, the weld may have a thickness which is up to about 10% greater than the thickness of one or both metal substrates, for example about 1% greater, about 2% greater, about 3% greater, about 4% greater, about 5% greater, about 6% greater, about 7% greater, about 8% greater, about 9% greater, about 10% greater, and any ranges therein. In some embodiments, the weld may have a thickness which is from about 0.1 mm to about 0.5 mm greater than one or both metal substrates, for example about 0.1 mm, about 0.2 mm, about 0.3 mm, about 0.4 mm, about 0.5 mm, or any ranges therebetween. Advantageously, welds of thickness less than one or both of the metal substrates allow the weld to be further processed downstream without adjusting downstream equipment, such as by passing through tension levelers and rollers.

Additionally or alternatively, during the preparation stage, the controller 134 may control the cutting header 110 to direct the first laser beam 112 onto portions of the top surfaces 124 and/or portions of the bottom surfaces 122 of the first metal substrate 104A and/or the second metal substrate 104B to remove at least some of the coating 120 that may or may not be present on such surfaces. In some embodiments, the controller 134 may control the cutting header 110 such that either the gap 140 is formed first or the coating 120 is removed first.

In block 506 of FIG. 5 and as illustrated in FIG. 4, during a joining stage of the joining process, the controller 134 may control the joining header 108 to direct the second laser beam 114 onto the joining region 106. In various aspects, the joining header 108 directs the second laser beam 114 into the gap 140 to heat the surfaces of the metal substrates 104A-B within the gap 140 to form the weld 116. In various aspects, by forming the gap 140 in the preparation stage, the metal joiner system 100 can form the weld 116 during the joining stage with minimal debris creation and with an improved thickness because the second laser beam 114 can be directed into the gap 140. As illustrated in FIG. 4, in various aspects, the controller 134 controls the joining header 108 such that the weld 116 formed by the second laser beam 118 has a thickness 142 that is less than a thickness (i.e., distance between the top surface 124 and the bottom surface 122) of the first metal substrate 104A and/or a thickness of the second metal substrate 104B. In certain examples, the controller 134 controls the joining header 108 such that the weld 116 formed by the second laser beam 118 has outer weld surfaces 132 that are recessed relative to the top surfaces 124 and/or the bottom surfaces 122. In some embodiments, the outer weld surfaces 132 are recessed by a recessed distance 130 relative to the top surfaces 124 and/or the bottom surfaces 122. The weld 116 having the reduced thickness and/or that is recessed relative to the surfaces 124, 122 may provide an improved joint between the metal substrates 104A-B compared to traditional joints because the weld 116 can be subsequently processed by other equipment (such as a tension leveler) without requiring the equipment to be adjusted for a thicker joint as has been traditionally required.

As mentioned, during the preparation stage and the joining stage of the joining process, the controller 134 may control the metal joiner 102 to travel along the travel direction 118 at a welding speed. In some non-limiting examples, the welding speed may be greater than or equal to about 3 meters per minute, such as about 20 meters per minute, such as about 60 meters per minute, or as otherwise desired. In other examples, the welding speed may be less than about 3 meters per minute. While the preparation stage and the joining stages of the joining process have been described separately, the two stages may be performed simultaneously by the metal joiner 102. For example, referring back to FIG. 1, during the joining process, the controller 134 may control the metal joiner 102 such that the cutting header 110 directs the first laser beam 112 onto a first portion of the joining region 106 while the joining header 108 directs the second laser beam 114 onto a second portion of the joining region 106 and while the metal joiner 102 is moving in the travel direction 118.

FIGS. 6 and 8-25 illustrates another example of a metal joiner system 200 according to various embodiments. The metal joiner system 200 is substantially similar to the metal joiner system 100 and includes the metal joiner 102 having the cutting header 110 and the joining header 108. Similar to the metal joiner system 100, the metal joiner system 200 also includes the controller 134. Although not illustrated, the metal joiner system 200 may also include a power source.

Figure 6:
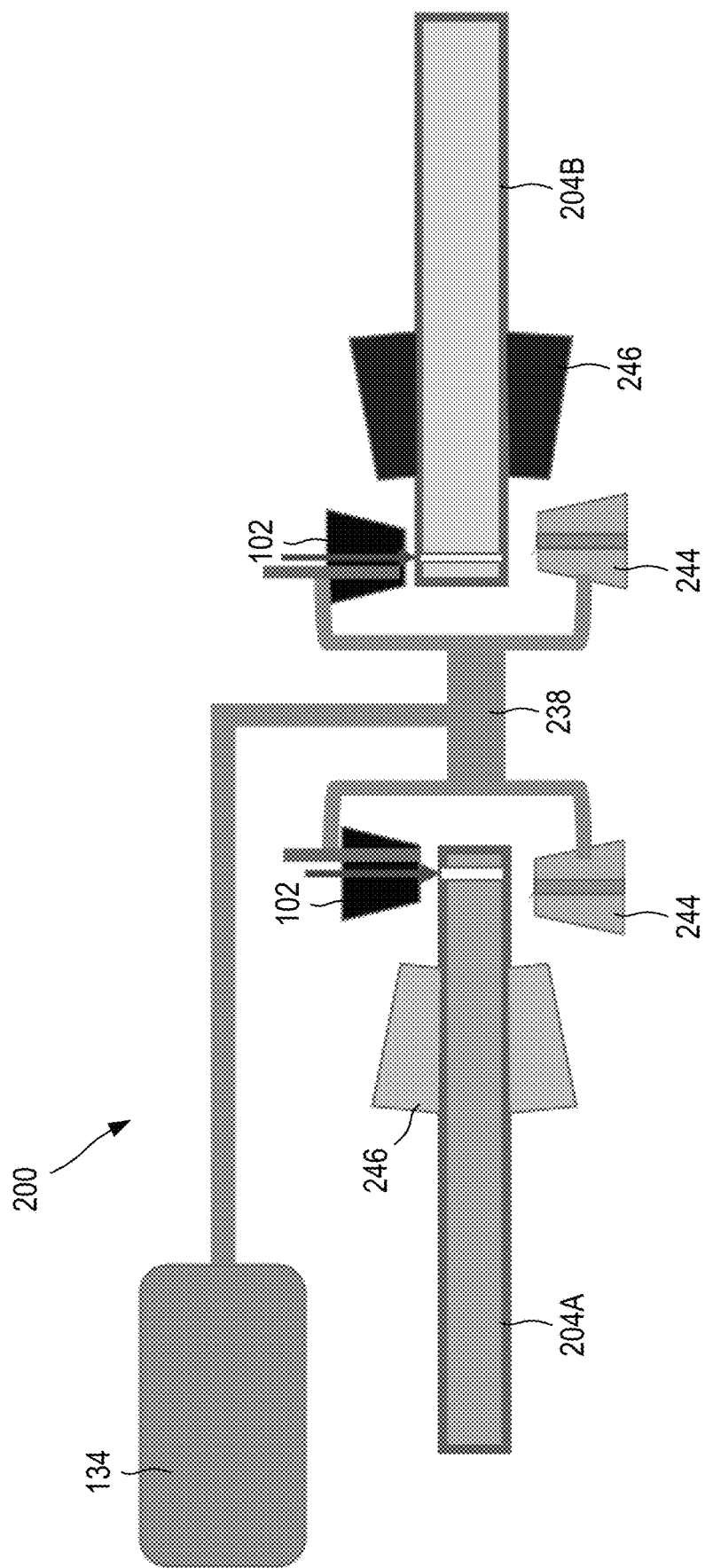
FIG. 6 illustrates a metal joiner system with a cleaner head, holders, and a metal cutting header according to embodiments

Compared to the support 138 metal joiner system 200, a support 238 of the metal joiner system 200 is modified such that the support 238 can support more than one metal joiner 102. As illustrated in FIG. 6, compared to the metal joiner system 100, the metal joiner system 200 also includes at least one cleaning header 244 and at least one holder 246. In the example of FIG. 6, the metal joiner system 200 includes two cleaning headers 244 and two holders 246, although any desired number of cleaning headers 244 and/or holders 246 may be utilized. In various embodiments, the cleaning headers 244 are connected to at least one metal joiner 102 via the support 238 (or other suitable structure) such that the cleaning header 244 moves in conjunction with at least one metal joiner 102. In the example illustrated, a single support 238 supports both metal joiners 102 and both cleaning headers 244. In other examples, all of the metal joiners 102 and/or cleaning headers 244 need not be supported on a single support.

Figure 11:
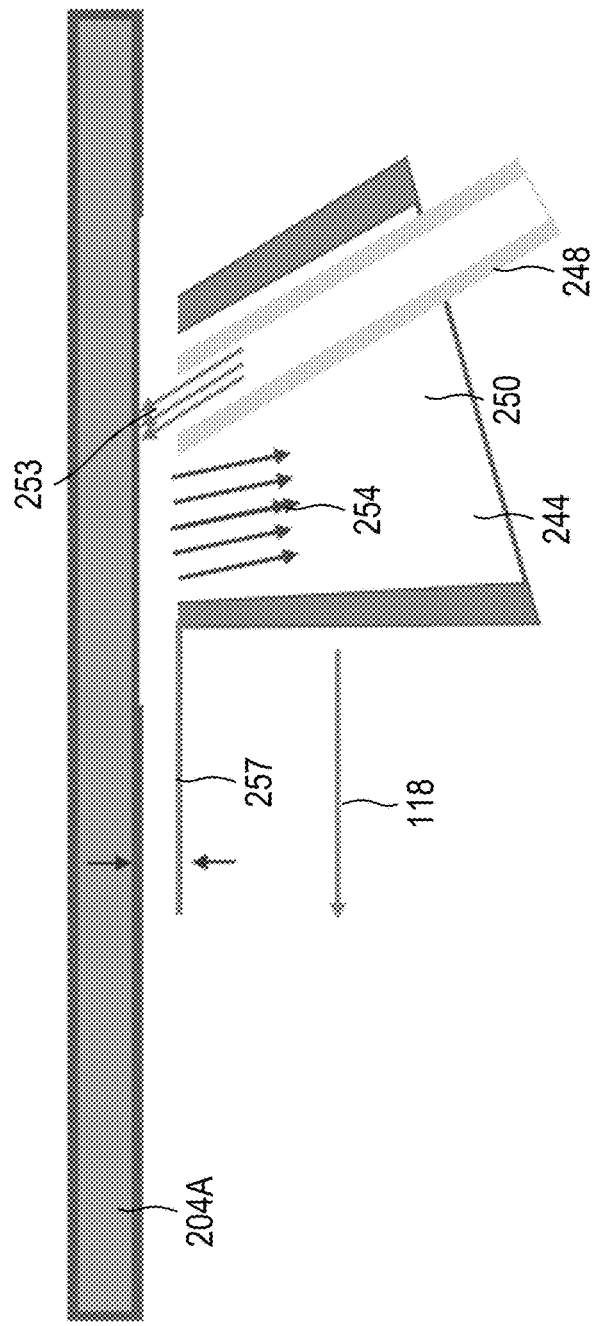
FIG. 11 is a side view of the cleaner head of the metal joiner system of FIG. 6 during the joint preparation stage according to embodiments.
Figure 12:
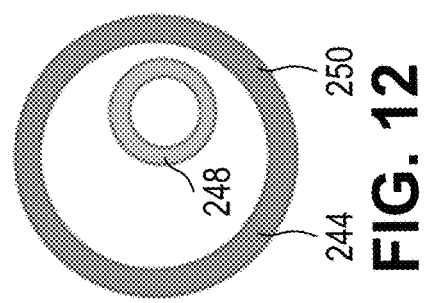
FIG. 12 is a bottom view of the cleaner head of FIG. 6 according to embodiments.

As best illustrated in FIGS. 11 and 12, in some embodiments, each cleaning header 244 includes an inner nozzle 248 that is configured to direct a cleaning force 252 onto the joint region and an outer nozzle 250 that is configured to provide a vacuum force 254 and suck in dust air and/or other debris. In certain embodiments, the cleaning force 252 may be provided by a cleaning agent including but not limited to compressed air, acetone, a laser beam or other suitable cleaning agents or means as desired. Moreover, in other embodiments, the cleaning headers 244 may be other suitable devices or components that can selectively apply the cleaning force 252 as desired. As a non-limiting example, one or more cleaning headers 244 may be a wiper that may move parallel (or otherwise as desired) to the cutting header 244 and ahead of the cutting header 244. In this embodiment, the wiper (e.g., a blade or other suitable wiper devices) may optionally be attached to the same unit, and the wiper would apply a cleaning force before the cutting header 110.

Figure 10:
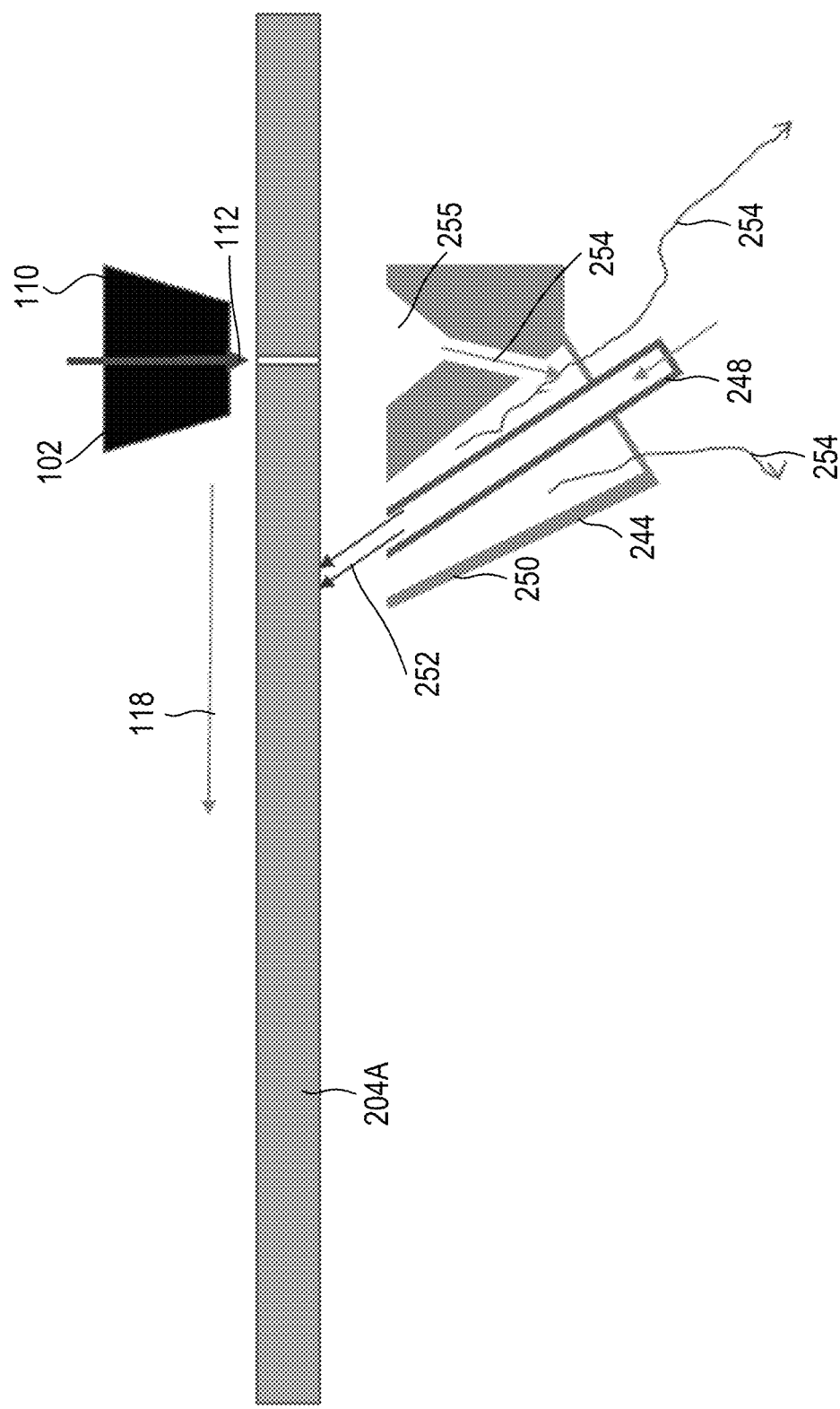
FIG. 10 is a side view of the metal joiner system of FIG. 6 during a joint preparation stage of the method of FIG. 7 according to embodiments.

In some embodiments, the inner nozzle 248 and outer nozzle 250 are each arranged at an oblique angle relative to a surface being cleaned such that the cleaning force 252 and vacuum force 254 are applied at an oblique angle. In other examples, the nozzles 248, 250 need not be at an oblique angle. Optionally, and as illustrated in FIG. 10, the cleaning header 244 includes a supplemental nozzle 255 that is configured to provide the vacuum force 254. In certain aspects, the supplemental nozzle 255 is configured to vertically align with (or be proximate to) the cutting header 110 such that the supplemental nozzle 255 can collect dust and/or other debris generated by the cutting header 110 when it applies the first laser beam 112. The cleaning headers 244 may be positioned on the same side of a metal substrate as the metal joiner 102 or on an opposite side of the metal substrate from the metal joiner 102. In certain embodiments, the cleaning header 244 is configured to direct the cleaning force 252 and the vacuum force 254 ahead of the lasers from the metal joiner 102 in the travel direction 118. As illustrated in FIG. 11, the cleaning header 244 may be offset from a metal substrate by a gap 257. In some non-limiting examples, the gap 157 may be from 1 mm to 2 mm, although it may be less than 1 mm and/or greater than 2 mm in other embodiments.

Each holder 246 is configured to grip and/or otherwise hold a metal substrate during the process. The holders 246 may be various suitable mechanisms or devices for gripping a metal substrate, including but not limited to mechanical grippers to create direct contact, robotic arms, or other suitable devices as desired.

In certain embodiments, the metal joiner system 200 (and/or the metal joiner system 100) may be used to join various metal substrates as desired. As some non-limiting examples, the metal joiner system 200 (and/or the metal joiner system 100) may be used to join similar or dissimilar rolled steel sheets, similar or dissimilar rolled aluminum sheets, and/or other metal sheets or metal products as desired.

Figure 7:
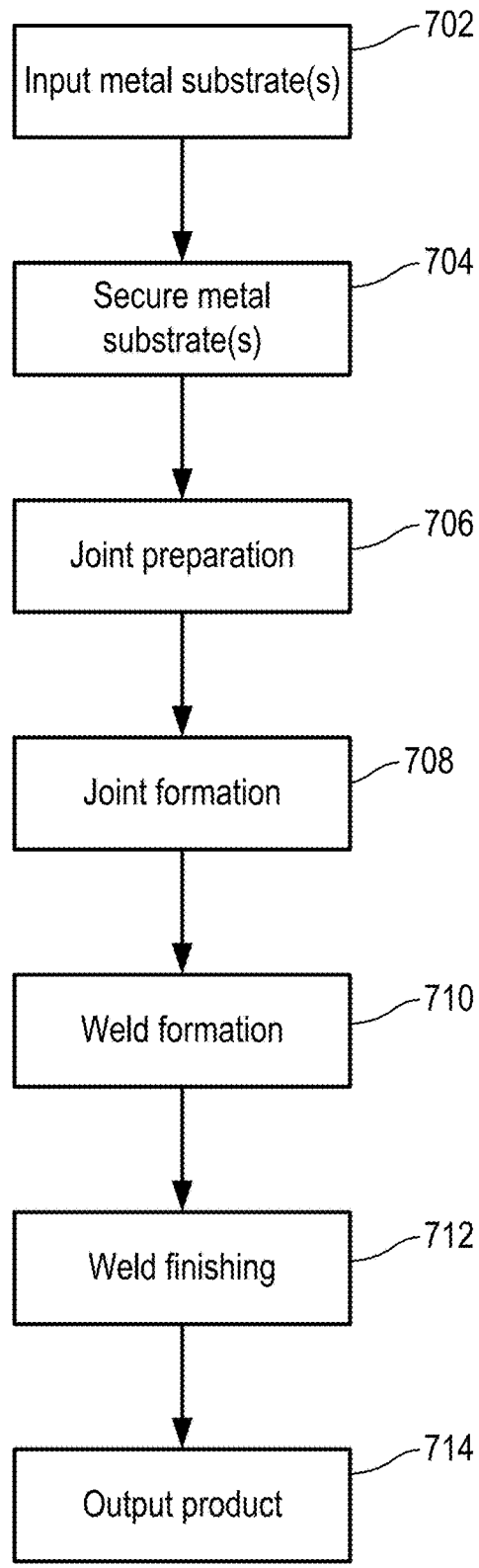
FIG. 7 is a flow chart of a method of joining metal substrates with the metal joiner system of FIG. 6 according to embodiments.

FIG. 7 illustrates another example of a method of joining metal substrates according to various embodiments. In certain aspects, the method may be utilized to join various metal substrates as desired, including but not limited to steel and aluminum. In certain aspects, the method has an improved processing time (i.e., the time needed to perform all the stages illustrated in FIG. 7). In one non-limiting example, the processing time may be less than a minute, such as about 50 seconds. In other examples, the processing time may be greater than a minute and/or less than 50 seconds as desired.

Block 702 is an input stage of the method. Referring to FIG. 8, in various embodiments, during the input stage, the two metal substrates 204A-B are initially provided. IN certain aspects, the metal substrates 204A-B are metal coils. Each metal substrate 204A-B may have its own unique identifier. The metal substrates 204A-B may have different gauges, the same gauge, dissimilar alloy type, a same alloy type, may come from a cold rolling process, may come from a hot rolling process, may each have its own tempering condition (e.g., F temper), may be cut via shear cutting, band saw cutting, or other suitable cutting techniques and having any cut edge quality as desired, and/or may include any grade of metal (e.g., any grade of steel and/or any grade of aluminum rolled sheets) as desired. In the embodiment of FIG. 8, the metal substrates 204A-B have different gauges. Optionally, the metal substrates 204A-B have a gauge less than or equal to 6 mm.

Block 704 is a securing stage of the method. Referring to FIG. 8, during the securing stage, the metal substrates 204A-B are each held by the metal holders 246. In one non-limiting example, the securing stage may take about 10 seconds, although it need not be 10 seconds in other embodiments.

Block 706 is a joint preparation stage of the method. Referring to FIGS. 6 and 9, during the joint preparation stage, the cutting headers 110 direct the first laser beams 112 to cut the portions of the metal substrates 204A-B. During the joint preparation stage, the inner nozzle 248 of the cleaning header 244 directs the cleaning agent such that the cleaning force 252 is applied directly on the joint region to remove lubricant and/or otherwise prepare the joint region as desired. As previously mentioned, in certain aspects, the cutting header 110 is controlled to produce a rough (at a high speed) laser cut, which may produce microvoids 261 (see FIG. 14) when the metal substrates 204A-B are placed together. In such examples, molten metal (produced by the laser of the joining header 108) wicks into these microvoids 261 during welding, and the microvoids 261 themselves contribute to the thickness of the weld 116 being about the same as or less than the metal substrates. As previously mentioned, in certain embodiments, the weld may have a thickness which is up to about 10% greater than the thickness of one or both metal substrates, for example about 1% greater, about 2% greater, about 3% greater, about 4% greater, about 5% greater, about 6% greater, about 7% greater, about 8% greater, about 9% greater, about 10% greater, and any ranges therein. In some embodiments, the weld may have a thickness which is from about 0.1 mm to about 0.5 mm greater than one or both metal substrates, for example about 0.1 mm, about 0.2 mm, about 0.3 mm, about 0.4 mm, about 0.5 mm, or any ranges therebetween. Advantageously, welds of thickness less than one or both of the metal substrates allow the weld to be further processed downstream without adjusting downstream equipment, such as by passing through tension levelers and rollers.

During the joint preparation stage, the outer nozzle 248 applies the vacuum force 254 such that the debris removed by the cleaning force 252 and/or by the first laser beam 112 is removed. In one non-limiting example, the joint preparation stage may take about 10 seconds, although it need not be 10 seconds in other embodiments.

Figure 13:
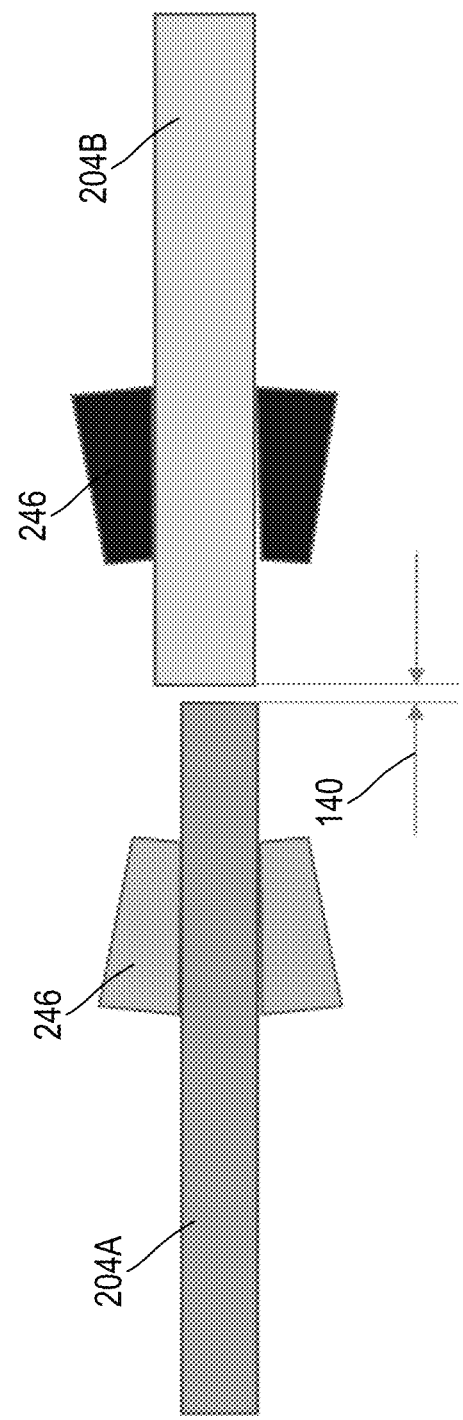
FIG. 13 is an end view of the metal joiner system of FIG. 6 during a joint formation stage of the method of FIG. 7 according to embodiments.
Figure 14:
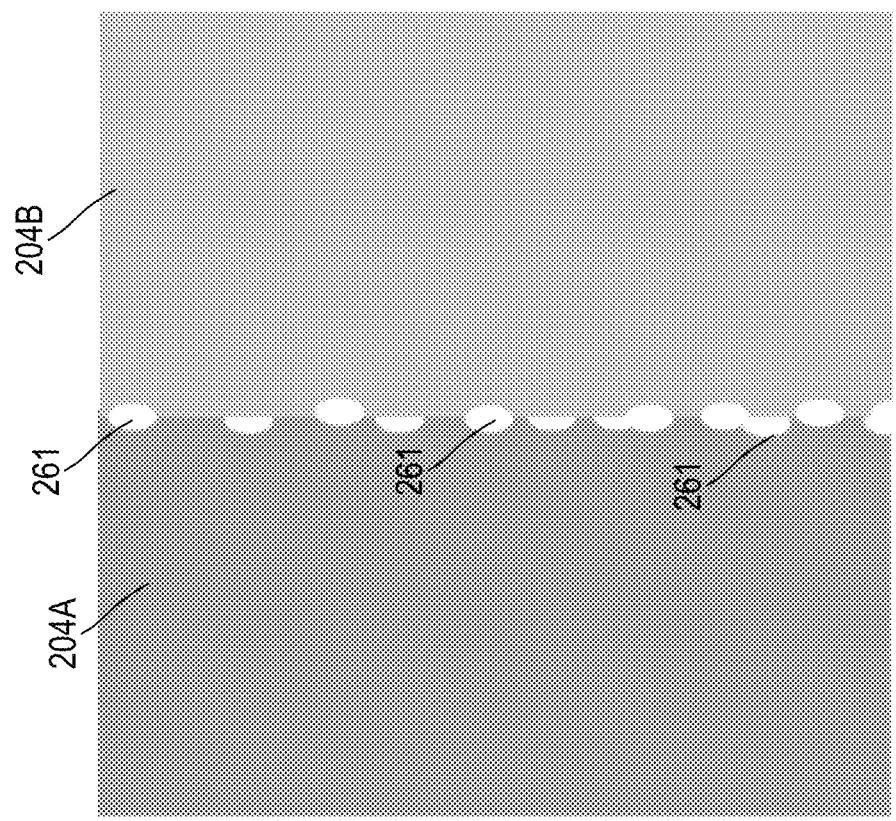
FIG. 14 is a top view of metal substrates during the joint formation stage of the method of FIG. 7 according to embodiments.

Block 708 is a joint formation stage of the method. In one non-limiting example, the joint preparation stage may take about 5 seconds, although it need not be 5 seconds in other embodiments. Referring to FIGS. 13 and 14, during the joint formation stage, at least one metal substrate 204A-B, and optionally both metal substrates 204A-B are advanced towards each other to from the gap 140 between the faying edges of the metal substrates 204A-B. As previously mentioned, in certain aspects, the gap 140 is less than or equal to about 0.5 mm, such as less than or equal to about 0.4 mm, such as less than or equal to about 0.3 mm, such as less than or equal to about 0.2 mm, such as less than or equal to about 0.1 mm. In other embodiments, the gap 140 is greater than 0.5 mm. As illustrated in FIG. 14, the faying edges may have full or half microvoids 261 (exaggerated in size in FIG. 14 for purposes of illustration). In some optional examples, the joint formation stage may be performed prior to the joint preparation stage (block 706).

Block 710 is a weld formation stage of the method. Referring to FIGS. 15-18, during the weld formation stage, the joining header 108 directs the second laser beam 114 onto the joining region to join the metal substrates 204A-B while the holders 246 hold the metal substrates 204A-B in place. Optionally, the metal joiner system 200 includes a purge nozzle 260 that is configured to direct a purging agent (e.g., argon) onto the joint region to minimize the direct contact of the weld metal from the environmental atmosphere during the joining process and to remove gases or vapors that might be harmful to the welded joint as it is being welded and immediately after welding. Optionally, the weld formation stage may be performed simultaneously with the joint preparation stage or separately from the joint preparation stage (e.g., in a separate pass over the joint region).

Figure 15:
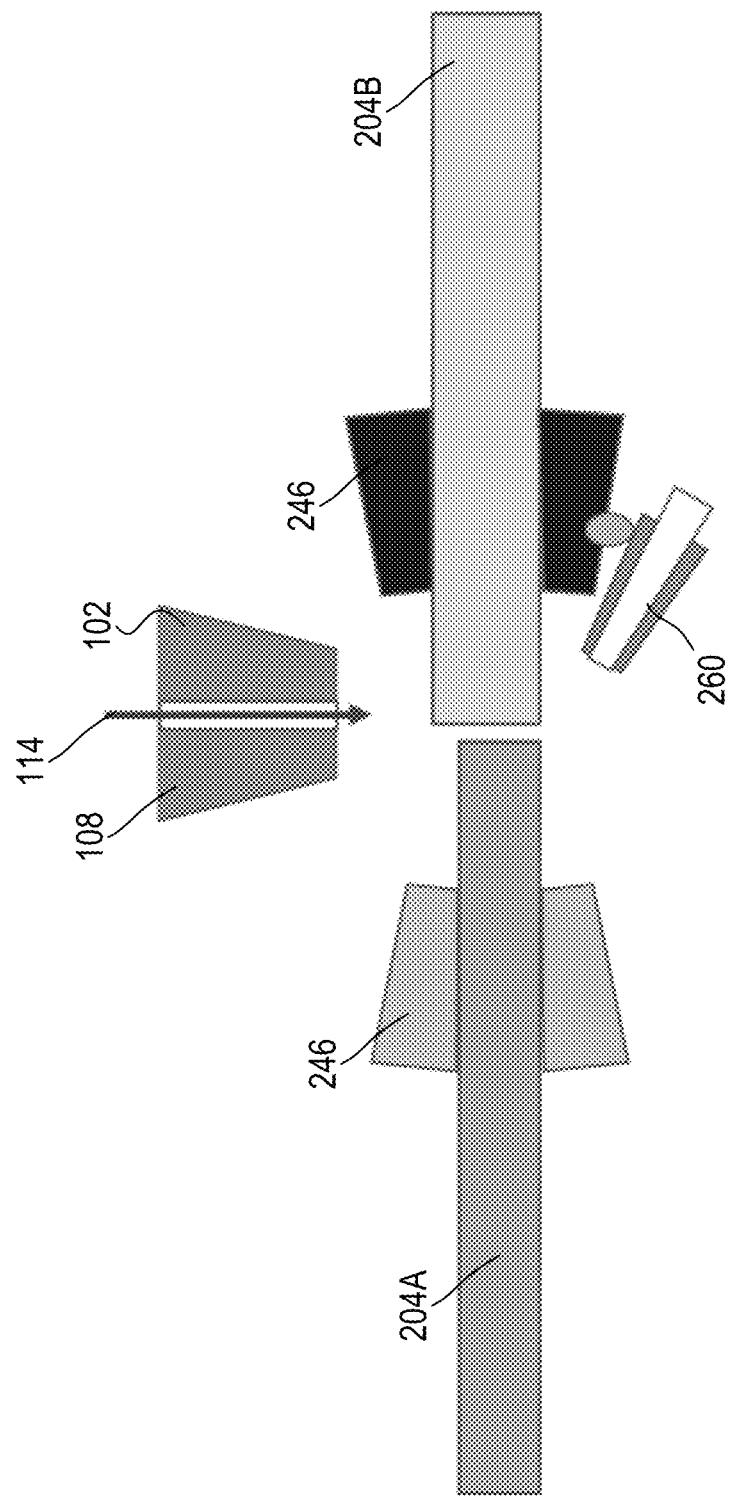
FIG. 15 is an end view the metal joiner system of FIG. 6 during a weld formation stage of the method of FIG. 7 according to embodiments.
Figure 17:
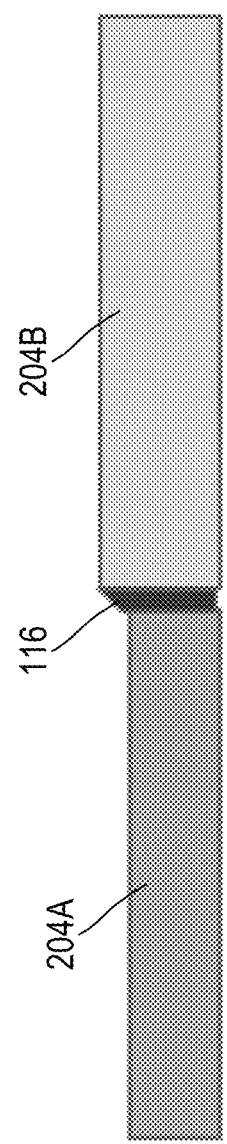
FIG. 17 is an end view of a weld formed with metal substrates by the metal joiner system of FIG. 6 with metal substrates having different gauges according to embodiments.
Figure 18:
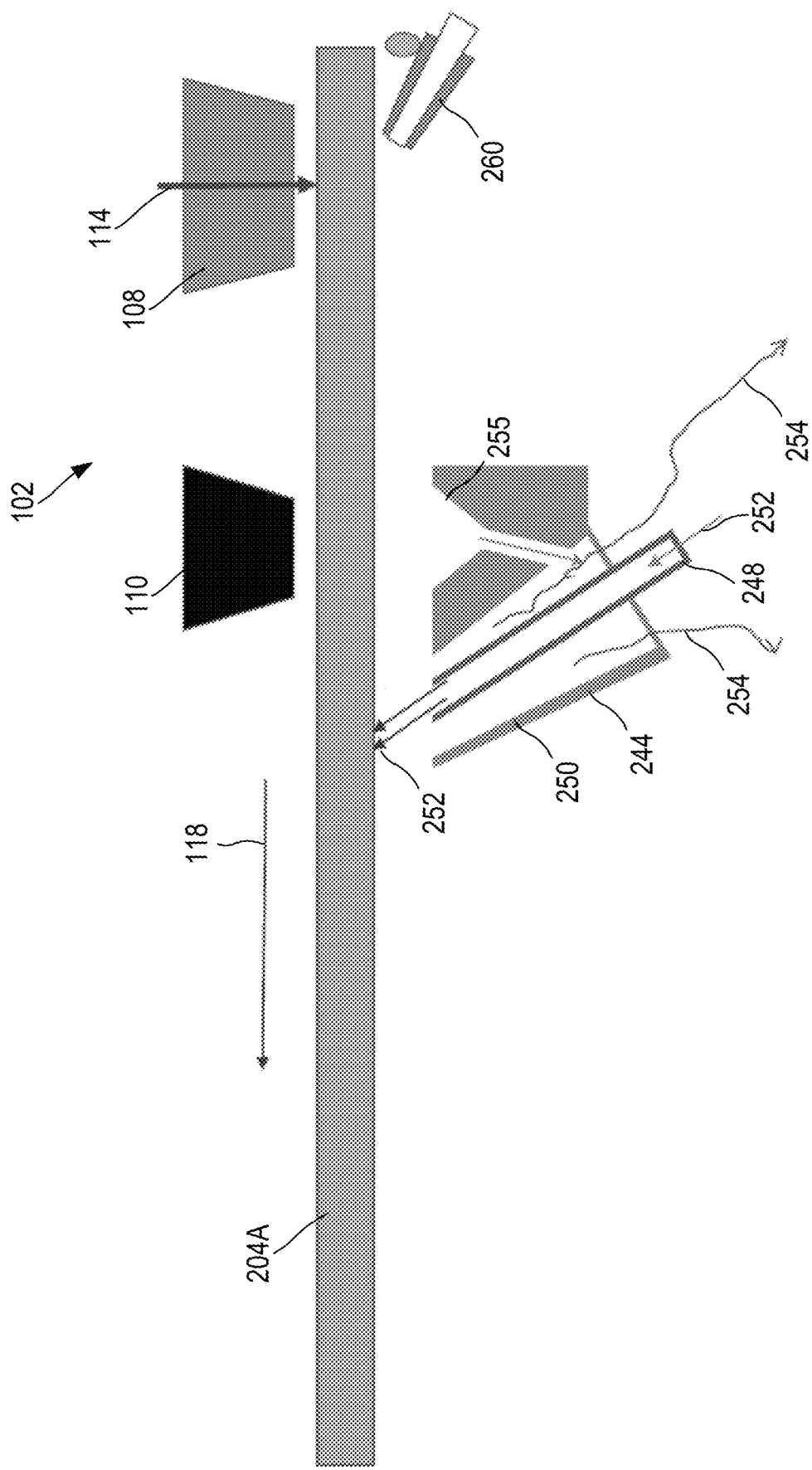
FIG. 18 is a side view of the metal joiner system of FIG. 6 during the weld formation stage of the method of FIG. 7 according to embodiments.

Referring to FIGS. 15 and 17, in examples where the metal substrates 204A-B have dissimilar gauges, the weld 116 is thinner than the thicker gauge metal substrate. In such examples with dissimilar gauges, during the weld formation stage, the second laser beam 114 from the joining header 108 may be offset from the joint region and may be applied on the thicker gauge metal substrate (see, e.g., FIG. 15).

Figure 16:
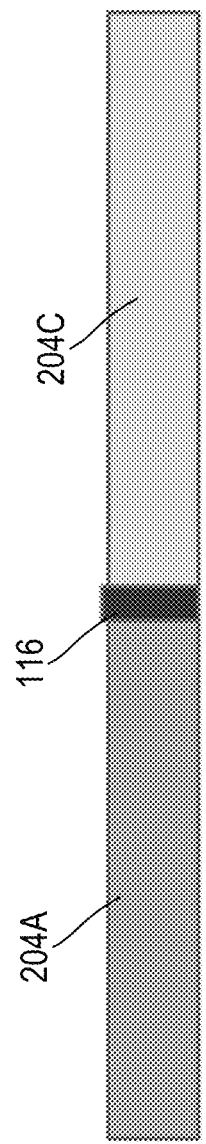
FIG. 16 is an end view of a weld formed by the metal joiner system of FIG. 6 with metal substrates having the same gauge according to embodiments.

Referring to FIG. 16, in other embodiments, the metal substrate 204A may be joined with a metal substrate 204C having the same gauge as the metal substrate 204A. In these embodiments, the weld 116 may optionally have a weld reinforcement less than 0.2 mm and/or 10% of the metal substrate thickness. In examples with similar gauges, during the weld formation stage, the second laser beam 114 may be applied on the joint region (e.g., on both of the metal substrates).

Figure 19:
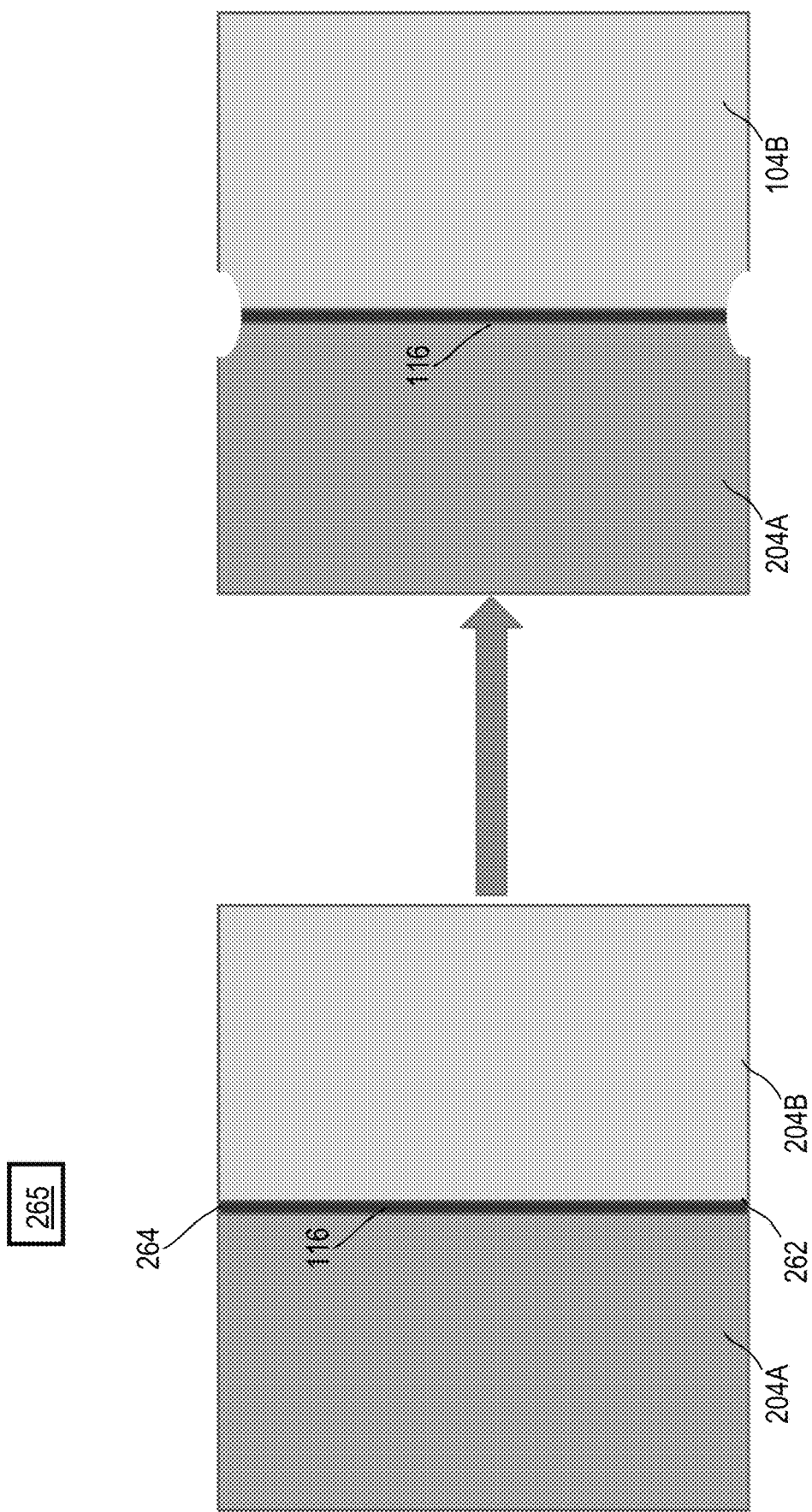
FIG. 19 is a top view of metal substrates during a weld finishing stage of the method of FIG. 7 according to embodiments.

Block 712 is a weld finishing stage of the method. In certain aspects, the weld finishing stage may be optional. Referring to FIG. 19, during the weld finishing stage, the weld start region 262 and the weld end region 264 of the weld 116 are removed via a weld or joint finisher 265, which may be various suitable mechanisms or devices as desired. As some non-limiting examples, the weld start region 262 and the weld end region 264 may be removed by the joint finisher 265 via a punch, local shear cutting, laser cutting, or various other mechanisms or devices as desired. In certain aspects, removing the weld start region 262 and the weld end region 264 may remove stress locations and remove weld defects on the joined metal substrates, thereby improving their suitability for additional processing without (or minimizing) breaks in the weld or causing damage to processing machines. In some embodiments, the joined metal substrates which have had the weld start region 262 and the weld end region 264 removed may be capable of passing through a set of processing rollers with various diameters ranging from 600 mm to 1200 mm at least 50 times up and down without break at the weld, for example about 50 times, about 60 times, about 70 times, about 80 times, about 90 times, or about 100 times, or any ranges therebetween.

Figure 21:
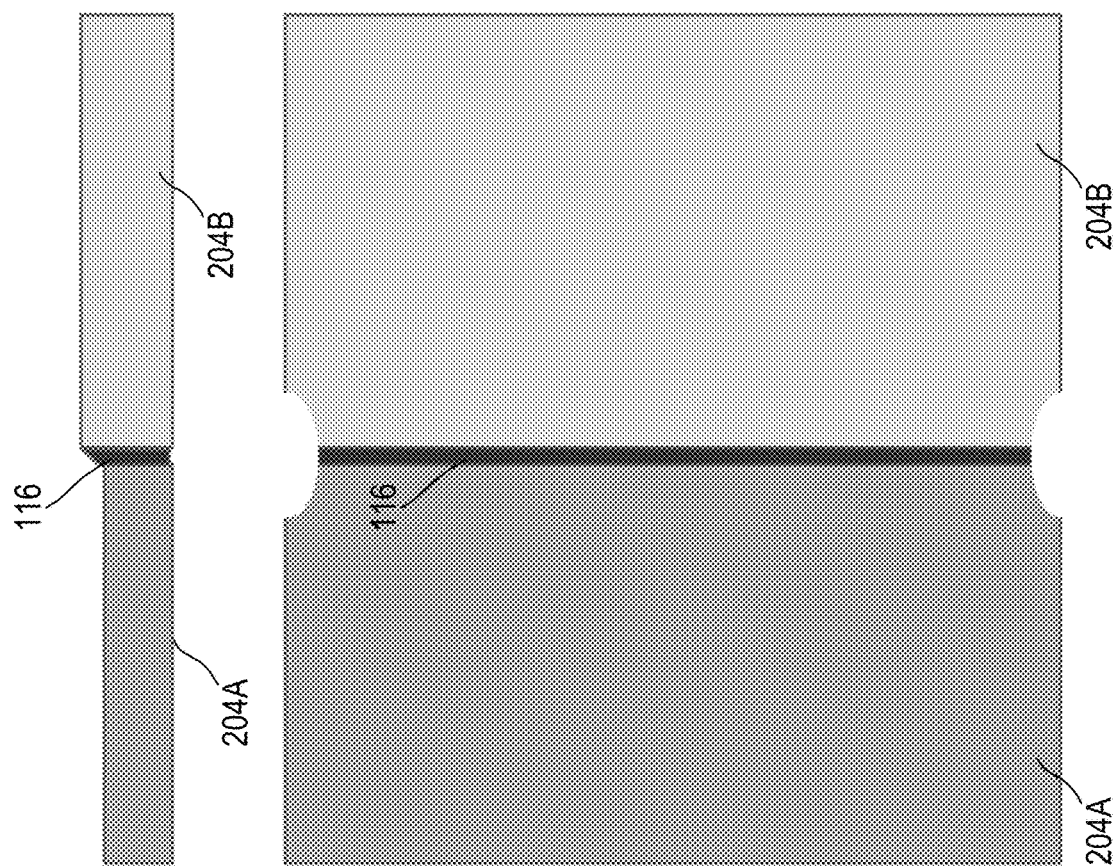
FIG. 21 is an end view and a top view of joined metal substrates having different gauges and during an output stage of the method of FIG. 7.
Figure 20:
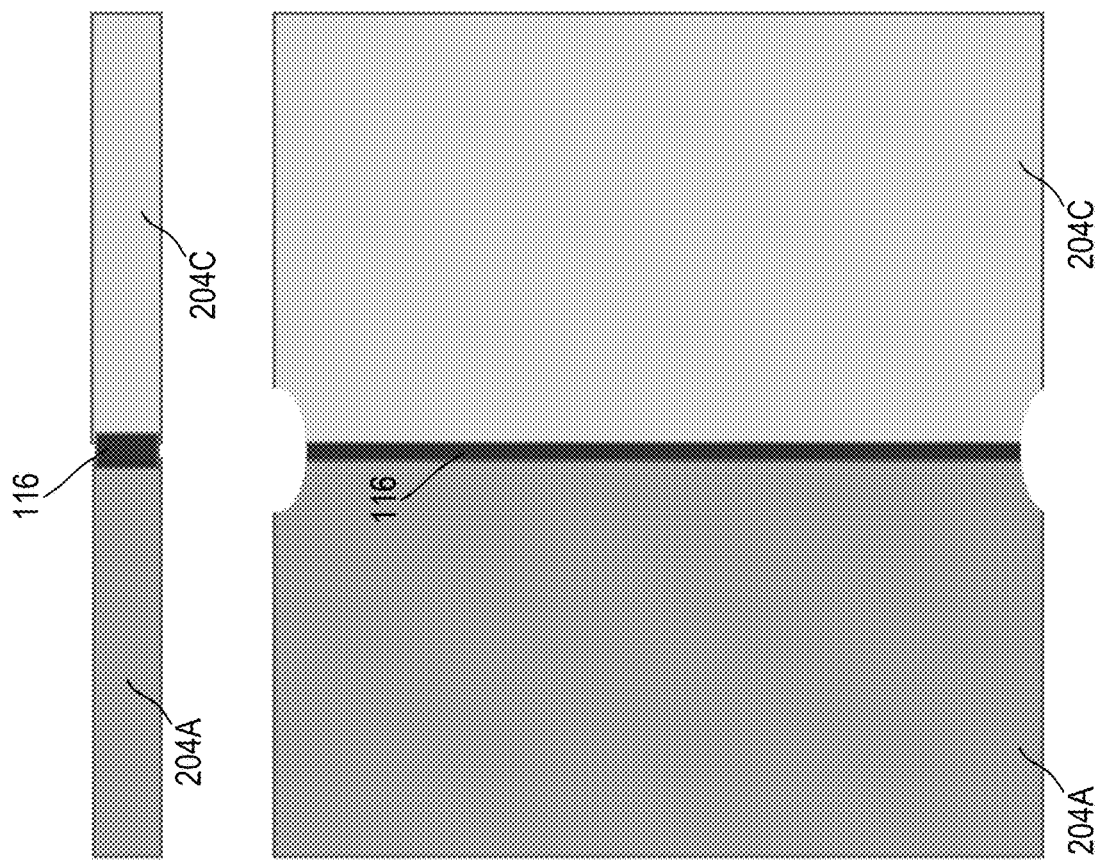
FIG. 20 is an end view and a top view of joined metal substrates having the same gauge and during an output stage of the method of FIG. 7.

Block 714 is an output stage of the method. FIG. 20 illustrates the metal substrates 204A and 204C (having the same gauge) in the output stage, and FIG. 21 illustrates the metal substrates 204A-B (having dissimilar gauges) in the output stage. As illustrated in FIGS. 20 and 21, in various embodiments, in the output stage, a thickness of the weld 116 is less than a thickness of at least one of the metal substrates and optionally is less than the thickness of both metal substrates. In various embodiments, in the output stage, a thickness of the weld 116 is greater than a thickness of at least one of the metal substrates and optionally is greater than the thickness of both metal substrates with the weld reinforcement being in a range less than 0.2 mm or 10% the metal substrate thickness for welds with same gauges.

It will be appreciated that in embodiments where the metal joiner system 200 in FIG. 6 includes two metal joiners 102 (each with a cutting header 110) and at least one cleaning header 244, a single cutting header 110 (e.g., of one of the metal joiners 102) and cleaning header 244 may be used in a first pass and a second cutting header 110 (of the other metal joiner 102) and cleaning header 244 may be used in a second pass, or both pairs of metal joiners 102 (and as such both cutting headers 110) and cleaner headers 244 may be used at the same time. In some embodiments, using more than one pair of metal joiner 102 and cleaning header 244 at a time may make cutting in non-linear shapes easier and/or more accurate over time.

FIGS. 22-25 illustrate non-limiting examples of various orientations of welds 116 relative to a processing direction 270 and that can be produced via the metal joiner system 100 or the metal joiner system 200. As illustrated, the welds 116 may be perpendicular, tilted, curved, or have other shapes or orientations as desired. In some embodiments, a non-perpendicular weld 116 may minimize the portion of the weld that is under pressure from downstream rollers 274 (or other processing) at any time, while still requiring removal of less metal than current mechanical joining methods.

FIG. 21 illustrates an example of a weld 116 that is substantially perpendicular to the processing direction 270. In certain embodiments, the weld 116 of FIG. 21 may be suitable for joining similar or dissimilar gauge metal substrates.

Figure 22:
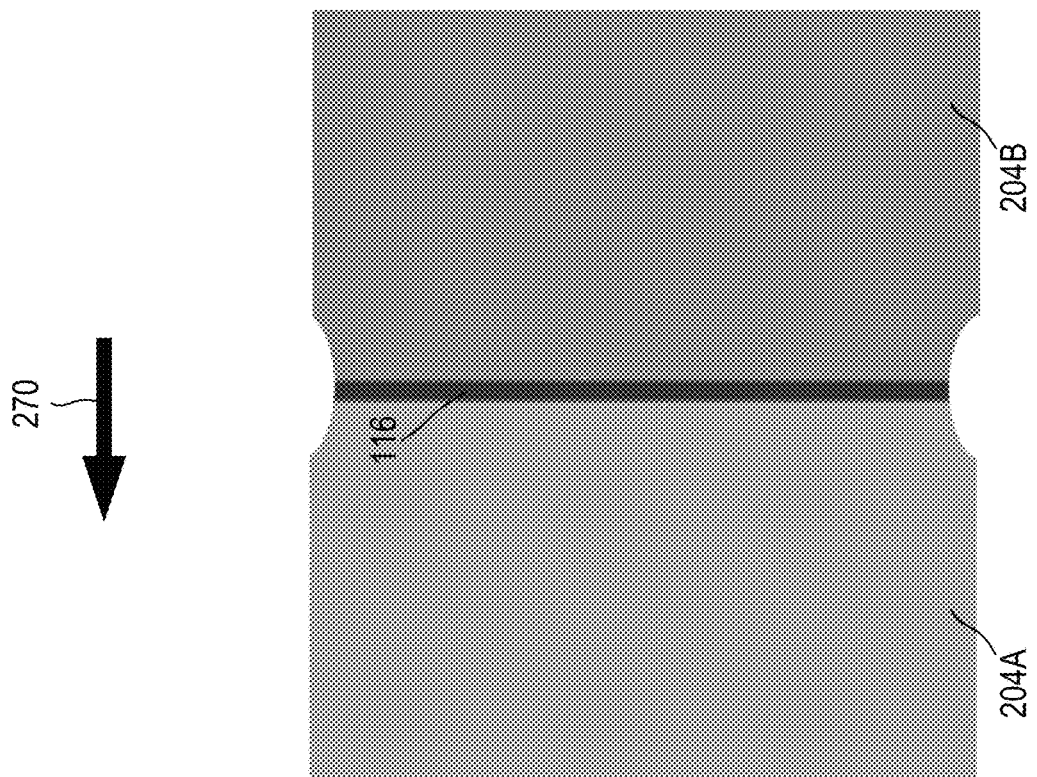
FIG. 22 is a top view of joined metal substrates during an output stage of the method of FIG. 7.

FIG. 22 illustrates an example of a weld 116 that is curved relative to the processing direction 270. As illustrated in FIG. 22, during processing, a first portion 272 of the weld 116 may engage a roller 274 (or other processing equipment) before other portions of the weld 116. The weld 116 of FIG. 22 may be suitable for joining similar or dissimilar gauge metal substrates.

Figure 23:
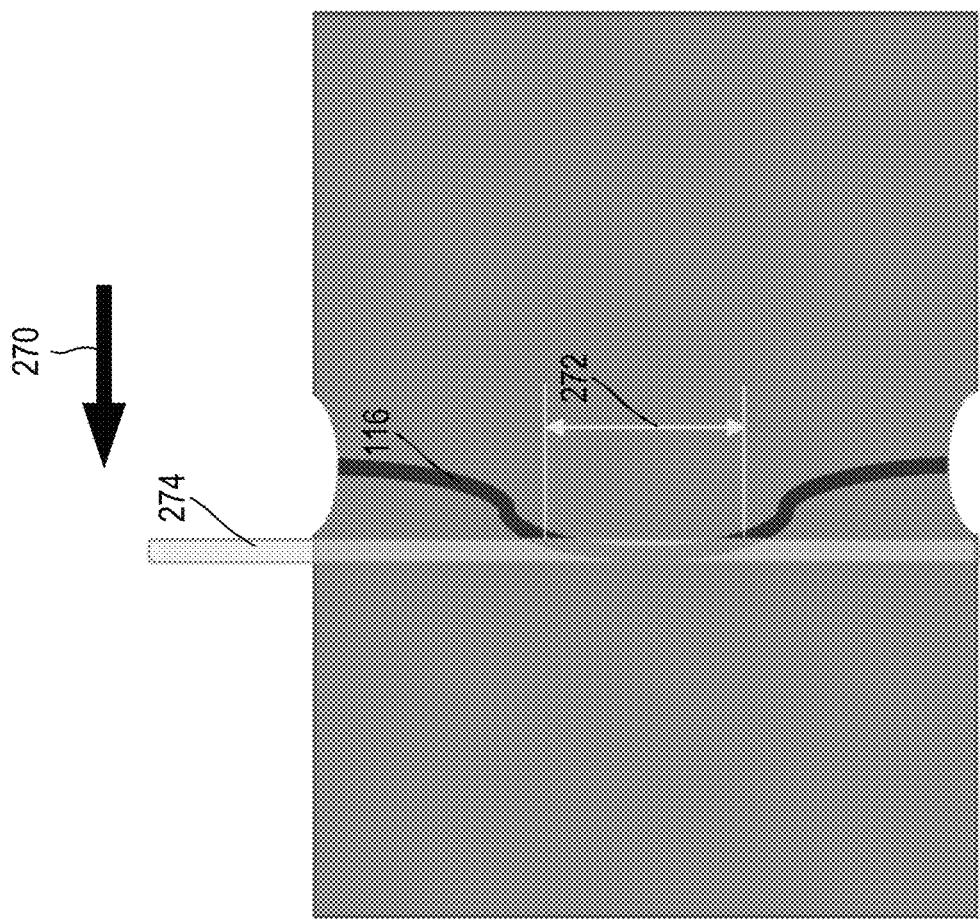
FIG. 23 is a top view of joined metal substrates during an output stage of the method of FIG. 7.
Figure 24:
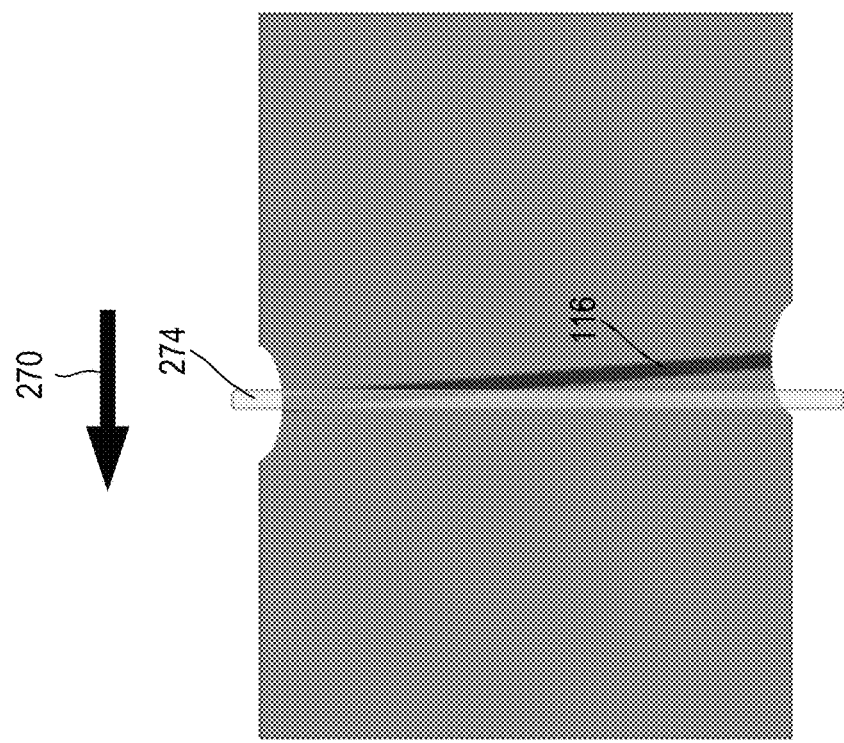
FIG. 24 is a top view of joined metal substrates during an output stage of the method of FIG. 7.

FIG. 23 illustrates an example of a weld 116 that is at a perpendicular or square angle relative to the processing direction 270. FIG. 24 illustrates an example of a weld 116 that is at an oblique angle relative to the processing direction 270. The weld 116 of FIG. 24 may be suitable for joining similar gauges. In one non-limiting example, the oblique angle may be less than or equal to 5° relative to the processing direction 270, such as less than or equal to 4°, such as less than or equal to 3°, such as less than or equal to 2°, such as less than or equal to 1°. Moreover, in in other embodiments, the oblique angle may be greater than 5 degrees. As some non-limiting examples, the oblique angle may be from greater than 0° to less than 90°. In other embodiments, the weld 116 may be at any other angle as desired relative to the processing direction 270.

Figure 25:
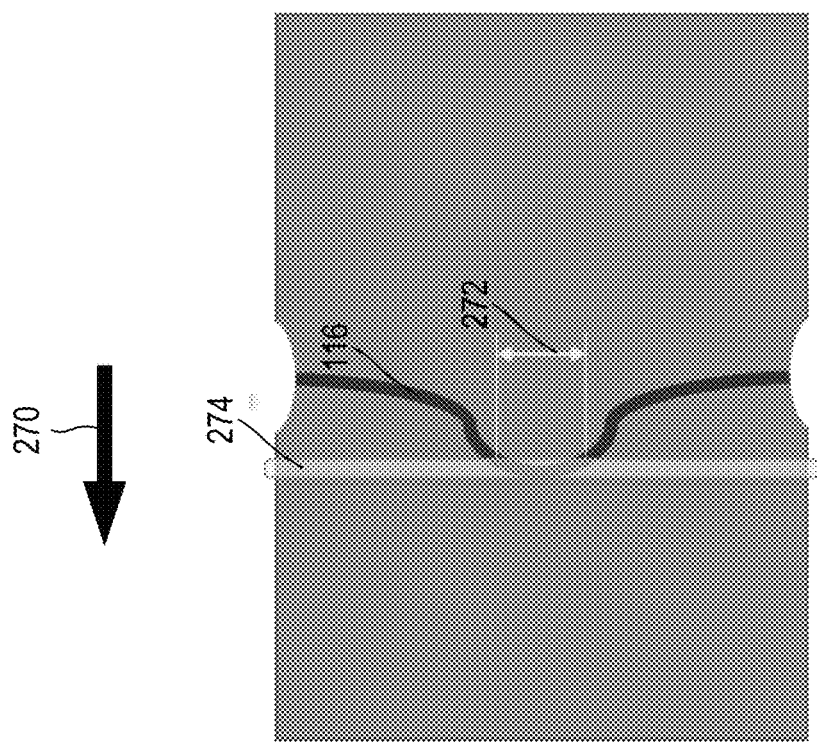
FIG. 25 is a top view of joined metal substrates during an output stage of the method of FIG. 7.

FIG. 25 illustrates an example of another weld 116 that is curved relative to the processing direction 270. Compared to the weld 116 of FIG. 23, the first portion 272 of the weld 116 of FIG. 25 has a reduced length. The weld 116 of FIG. 25 may be suitable for joining similar or dissimilar gauge metal substrates.

A collection of exemplary embodiments are provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1. A metal joiner system comprising: a power source; and a metal joiner comprising: a cutting header communicatively coupled to the power source and configured to prepare a joining region for forming a joint by directing a first laser beam from the metal joiner onto the joining region; and a joining header communicatively coupled to the power source and configured to form the joint in the joining region by directing a second laser beam from the metal joiner onto the joining region, wherein the joining header is connected to the cutting header such that the joining header moves with the cutting head.

Illustration 1a. The metal joiner system of any preceding or subsequent illustrations or combination of illustrations, wherein the metal joiner further comprises a cleaning header configured to prepare the joining region by directing a cleaning force from the cleaning header onto the joining region.

Illustration 1b. The metal joiner system of any preceding or subsequent illustrations or combination of illustrations, wherein the joining header is connected to the cutting header with the cleaning header attached such that the joining header moves with the cutting header simultaneously or separately.

Illustration 1c. The metal joiner system of any preceding or subsequent illustrations or combination of illustrations, wherein the metal joiner further comprises a joint finisher communicatively coupled to the power source and configured to remove metal at a weld start and crater regions of the joint.

Illustration 2. The metal joiner system of any preceding or subsequent illustrations or combination of illustrations, wherein the joining region is formed by faying edges of a first metal substrate and a second metal substrate during a metal joining process.

Illustration 3. The metal joiner system of any preceding or subsequent illustrations or combination of illustrations, further comprising a controller communicatively coupled to the metal joiner, wherein the controller is configured to control the cutting header such that the first laser beam forms a gap between the faying edges of the first metal substrate and the second metal substrate, and wherein the gap is less than 0.5 mm.

Illustration 4. The metal joiner system of any preceding or subsequent illustrations or combination of illustrations, wherein the joining region further comprises a top surface and a bottom surface of each of the first metal substrate and the second metal substrate, wherein the metal joiner system further comprises a controller communicatively coupled to the metal joiner, and wherein the controller is configured to control the cutting header such that the first laser beam is directed onto at least one of the top surface or the bottom surface.

Illustration 5. The metal joiner system of any preceding or subsequent illustrations or combination of illustrations, further comprising a controller communicatively coupled to the metal joiner, and wherein the controller is configured to move the metal joiner along a travel path at a speed of at least 3 meters per minute while at least one of the first laser beam or the second laser beam is directed from the metal joiner.

Illustration 6. The metal joiner system of any preceding or subsequent illustrations or combination of illustrations, wherein at least one characteristic of the second laser beam is different from the first laser beam, and wherein the at least one characteristic comprises at least one of a beam size or a beam pattern.

Illustration 7. The metal joiner system of any preceding or subsequent illustrations or combination of illustrations, wherein the metal joiner is movable along a travel path, and wherein the joining header is connected to the cutting header such that the first laser beam is applied on the travel path before the second laser beam is applied on the travel path.

Illustration 8. The metal joiner system of any preceding or subsequent illustrations or combination of illustrations, wherein the joining header is configured to direct the second laser beam onto a joint area formed by the faying edges of a first metal substrate and a second metal substrate during a metal joining process and form a joint at the joint area.

Illustration 8a. The metal joiner system any preceding or subsequent illustrations or combination of illustrations, further comprising a cleaning header configured to direct a cleaning force onto the joining region and apply a vacuum force onto the joining region.

Illustration 8b. The metal joiner system of any preceding or subsequent illustrations or combination of illustrations, wherein the cleaning header is configured to direct the cleaning force onto at least one of a top surface and a bottom surface of the joint.

Illustration 8c. The metal joiner system of any preceding or subsequent illustrations or combination of illustrations, wherein the cleaning force comprises at least one of a chemical solvent, a wiper blade, compressed air, or a laser beam.

Illustration 8d. The metal joiner system of any preceding or subsequent illustrations or combination of illustrations, further comprising a joint finisher configured to remove a portion of the joint from at least one of a top surface or a bottom surface of the joint.

Illustration 9. A metal joiner for a metal joiner system, the metal joiner comprising: a cutting header configured to prepare a joining region for forming a joint by directing a first laser beam from the metal joiner onto the joining region; and a joining header configured to form the joint in the joining region by directing a second laser beam from the metal joiner onto the joining region, wherein the joining header is connected to the cutting header such that the joining header moves with the cutting head.

Illustration 9a. The metal joiner of any preceding or subsequent illustrations or combination of illustrations, wherein the metal joiner further comprises a cleaning header and a joint finisher, wherein the joint finisher is configured to remove a portion of the joint from the joining region.

Illustration 9b. The metal joiner of any preceding or subsequent illustrations or combination of illustrations, wherein the joining header is connected to the cutting header such that the joining header moves with the cutting header simultaneously or separately.

Illustration 10. The metal joiner of any preceding or subsequent illustrations or combination of illustrations, wherein at least one characteristic of the second laser beam is different from the first laser beam, and wherein the at least one characteristic comprises at least one of a beam size, a beam intensity, or a beam pattern, and wherein the at least one characteristic comprises at least one of a beam size or a beam pattern.

Illustration 11. The metal joiner of any preceding or subsequent illustrations or combination of illustrations, wherein the metal joiner is movable along a travel path, and wherein the joining header is connected to the cutting header such that the first laser beam is applied on the travel path before the second laser beam is applied on the same travel path.

Illustration 11a. The metal joiner of any preceding or subsequent illustrations or combination of illustrations, wherein the joining region comprises a first metal substrate and a second metal substrate, and wherein the joining head is configured to form a joint having a thickness that is less than a thickness of the first metal substrate and that is less than a thickness of the second metal substrate.

Illustration 12. A metal joiner system comprising: the metal joiner of any preceding or subsequent illustrations or combination of illustrations; a controller communicatively coupled to the metal joiner; and a power source communicatively coupled to the cutting header and to the joining head.

Illustration 13. A metal joiner for a metal joiner system, the metal joiner comprising: a cutting header configured to prepare a joining region for forming a joint by directing a first laser beam from the metal joiner onto the joining region; and a joining header configured to form the joint in the joining region by directing a second laser beam from the metal joiner onto the joining region, wherein the metal joiner is movable along a travel path during a metal joining process, and wherein the joining header is connected to the cutting header such that the joining header is downstream from the cutting header along the travel path.

Illustration 14. The metal joiner of any preceding or subsequent illustrations or combination of illustrations, wherein the joining header is connected to the cutting header such that the first laser beam is applied on the travel path before the second laser beam is applied on the travel path.

Illustration 14a. The method of any preceding or subsequent illustrations or combination of illustrations, wherein preparing the joining region further comprises directing a cleaning header onto the joining region ahead of the cutting header on a bottom of the metal substrates.

Illustration 14b. The method of any preceding or subsequent illustrations or combination of illustrations, further comprising directing a joint finisher to remove a portion of the weld at one or more of a weld start, a weld crater, or weld defects.

Illustration 15. The metal joiner of any preceding or subsequent illustrations or combination of illustrations, wherein at least one characteristic of the second laser beam is different from the first laser beam, and wherein the at least one characteristic comprises at least one of a beam size or a beam pattern.

Illustration 16. The metal joiner of any preceding or subsequent illustrations or combination of illustrations, wherein the joining header is connected to the cutting header such that the joining header moves with the cutting head.

Illustration 16a. The method of any preceding or subsequent illustrations or combination of illustrations, wherein preparing the joining region comprises removing a contaminant from the joining region with a cleaning header.

Illustration 17. A metal joiner system comprising: the metal joiner of any preceding or subsequent illustrations or combination of illustrations; a controller communicatively coupled to the metal joiner; and a power source communicatively coupled to the cutting header and to the joining head.

Illustration 18. A method comprising: aligning an end edge of a first metal substrate with a start edge of a second metal substrate such that an edge surface of the end edge abuts an edge surface of the start edge, wherein the aligned end edge and start edge define a joining region; preparing the joining region for joining by directing a first laser beam onto the joining region with a cutting header of a metal joiner; and directing a second laser beam onto the joining region with a joining header of a metal joiner to form a weld, wherein forming the weld joins the first metal substrate with the second metal substrate.

Illustration 19. The method of any preceding or subsequent illustrations or combination of illustrations, wherein preparing the joining region comprises forming a gap in the joining region between the first metal substrate and the second metal substrate with the first laser beam, wherein the gap extends through a thickness of the first metal substrate and a thickness of the second metal substrate, and wherein a width of the gap is less than 0.5 mm.

Illustration 20. The method of any preceding or subsequent illustrations or combination of illustrations, wherein preparing the joining region comprises removing a contaminant from the joining region with the first laser beam.

Illustration 21. The method of any preceding or subsequent illustrations or combination of illustrations, wherein removing the contaminant comprises removing a lubricant from the joining region.

Illustration 22. The method of any preceding or subsequent illustrations or combination of illustrations, wherein preparing the joining region comprises directing the first laser beam onto a top surface of the first metal substrate, a bottom surface of the first metal substrate, a top surface of the second metal substrate, a bottom surface of the second metal substrate, the edge surface of the end edge, and the edge surface of the start edge.

Illustration 23. The method of any preceding or subsequent illustrations or combination of illustrations, wherein forming the weld comprises forming a weld having a weld thickness that is less than a thickness of the first metal substrate and less than a thickness of the second metal substrate.

Illustration 24. The method of any preceding or subsequent illustrations or combination of illustrations, wherein forming the weld comprises forming a weld with a top weld surface that is recessed relative to top surfaces of the first metal substrate and the second metal substrate and a bottom weld surface that is recessed relative to bottom surfaces of the first metal substrate and the second metal substrate.

Illustration 24a. The method of any preceding or subsequent illustrations or combination of illustrations, wherein directing the second laser beam comprises directing the second laser beam comprising at least one characteristic that is different from the first laser beam Illustration 25. The weld formed by the method of any preceding or subsequent illustrations or combination of illustrations.

Illustration 26. A weld joining a first metal substrate with a second metal substrate, wherein the weld comprises a top weld surface and a bottom weld surface, wherein the top weld surface is recessed relative to at least one of a top surface of the first metal substrate or a top surface of the second metal substrate, and wherein the bottom weld surface is recessed relative to at least one of a bottom surface of the first metal substrate or a bottom surface of the second metal substrate.

Illustration 27. The weld of any preceding or subsequent illustrations or combination of illustrations, wherein the weld extends substantially perpendicular to a processing direction of the joined first metal substrate and second metal substrate.

Illustration 28. The weld of any preceding or subsequent illustrations or combination of illustrations, wherein the weld is non-perpendicular to a processing direction of the joined first metal substrate and second metal substrate.

Illustration 28a. The weld of any preceding or subsequent illustrations or combination of illustration, wherein weld metals at one or more of the weld start or weld crater regions are removed from the first metal substrate and the second metal substrate.

Illustration 29. The weld of any preceding or subsequent illustrations or combination of illustrations, wherein the top weld surface is recessed relative to both the top surface of the first metal substrate and the top surface of the second metal substrate, and wherein the bottom weld surface is recessed relative to both the bottom surface of the first metal substrate and the bottom surface of the second metal substrate.

Illustration 30. A weld joining a first metal substrate with a second metal substrate, wherein the weld comprises a weld thickness, and wherein the weld thickness is less than at least one of a thickness of the first metal substrate or a thickness of the second metal substrate.

Illustration 30a. The weld of any preceding or subsequent illustrations or combination of illustrations, wherein forming the weld comprises forming a weld having a weld thickness that extends beyond a top surface of the first metal substrate and beyond a top surface of the second metal substrate by less than 0.2 mm or 10% of thickness of both the first metal substrate and the second metal substrate.

Illustration 31. The weld of any preceding or subsequent illustrations or combination of illustrations, wherein the weld extends substantially perpendicular to a processing direction of the joined first metal substrate and second metal substrate.

Illustration 32. The weld of any preceding or subsequent illustrations or combination of illustrations, wherein the weld is non-perpendicular to a processing direction of the joined first metal substrate and second metal substrate.

Illustration 33. The weld of any preceding or subsequent illustrations or combination of illustrations, wherein the weld thickness is less than both the thickness of the first metal substrate and the thickness of the second metal substrate.

Illustration 34. A method comprising: preparing a first metal substrate comprising a first end edge by clamping the first metal substrate and directing a first laser beam from a metal joiner on a first side of the first metal substrate to create a first faying surface on the first end edge of the first metal substrate; preparing a second metal substrate comprising a second end edge by clamping the second metal substrate and directing a second laser beam from the metal joiner on a first side of the second metal substrate to create a second faying surface on the second end edge of the second metal substrate; forming a joining region for the first metal substrate and the second metal substrate by abutting the first faying surface with the second faying surface; and directing a third laser beam onto the joining region with the metal joiner to form a weld, wherein forming the weld joins the first metal substrate with the second metal substrate.

Illustration 35. The method any preceding or subsequent illustrations or combination of illustrations, wherein preparing the first metal substrate further comprises applying a cleaning force on a second side of the first metal substrate opposite from the first side while directing the first laser beam, and wherein preparing the second metal substrate further comprises applying a cleaning force on a second side of the second metal substrate opposite from the first side while directing the second laser beam.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described embodiments, nor the claims that follow.

That which is claimed:

1. A metal joiner system comprising:
    a power source; and
    a metal joiner comprising:
        a cutting header communicatively coupled to the power source and configured to prepare a joining region for forming a joint, the joining region defined by contacting and abutting edges of a first metal substrate and a second metal substrate, the cutting header configured to prepare the joining region by generating a first laser beam and directing the first laser beam from the metal joiner onto the joining region, the first laser beam configured to cut through an entire thickness of the joining region and form a gap in the joining region through the entire thickness of the joining region; and
        a joining header communicatively coupled to the power source and configured to form the joint in the joining region by generating a second laser beam and directing the second laser beam from the metal joiner onto the joining region,
        wherein the joining header is connected to the cutting header such that the joining header moves with the cutting head.

2. The metal joiner system of claim 1, further comprising a controller communicatively coupled to the metal joiner, wherein the controller is configured to control the cutting header such that the first laser beam forms the gap between the edges of the first metal substrate and the second metal substrate, and wherein the gap is less than 0.5 mm.

3. The metal joiner system of claim 1, wherein the joining region further comprises a top surface and a bottom surface of each of the first metal substrate and the second metal substrate, wherein the metal joiner system further comprises a controller communicatively coupled to the metal joiner, and wherein the controller is configured to control the cutting header such that the first laser beam is directed onto at least one of the top surface or the bottom surface.

4. The metal joiner system of claim 1, wherein the joining header is configured to direct the second laser beam onto a joint area formed by the faying edges of the first metal substrate and the second metal substrate.

5. The metal joiner system of claim 1, further comprising a controller communicatively coupled to the metal joiner, and wherein the controller is configured to move the metal joiner along a travel path at a speed of at least 3 meters per minute while at least one of the first laser beam or the second laser beam is directed from the metal joiner.

6. The metal joiner system of claim 1, wherein at least one characteristic of the second laser beam is different from the first laser beam, and wherein the at least one characteristic comprises at least one of a beam size, a beam intensity, or a beam pattern.

7. The metal joiner system of claim 1, wherein the metal joiner is movable along a travel path, and wherein the joining header is connected to the cutting header such that the first laser beam is applied on the travel path before the second laser beam is applied on the travel path.

8. The metal joiner system of claim 1, further comprising at least one of:
    a cleaning header configured to direct a cleaning force onto the joining region and apply a suction force onto the joining region; or
    a joint finisher configured to remove metal at one or more of a weld start or crater regions of the joint.

9. The metal joiner system of claim 1, further comprising a cleaning header configured to direct a cleaning force onto the joining region and apply a suction force onto the joining region ahead of the first laser beam in a direction of travel.

10. A metal joiner for a metal joiner system, the metal joiner comprising:
    a cutting header configured to prepare a joining region for forming a joint, the joining region defined by contacting and abutting edges of a first metal substrate and a second metal substrate, the cutting header configured to prepare the joining region by generating a first laser beam and directing the first laser beam from the metal joiner onto the joining region, wherein the first laser beam is configured to cut through an entire thickness of the joining region to form a gap in the joining region extending through the entire thickness of the joining region; and
    a joining header configured to form the joint in the joining region by generating a second laser beam and directing the second laser beam from the metal joiner onto the joining region,
    wherein the joining header is connected to the cutting header such that the joining header moves with the cutting head.

11. The metal joiner of claim 10, wherein at least one characteristic of the second laser beam is different from the first laser beam, and wherein the at least one characteristic comprises at least one of a beam intensity, a beam size, or a beam pattern.

12. The metal joiner of claim 10, wherein the metal joiner is movable along a travel path, and wherein the joining header is connected to the cutting header such that the first laser beam is applied on the travel path before the second laser beam is applied on the travel path.

13. The metal joiner of claim 10, wherein the metal joiner further comprises a joint finisher, wherein the joint finisher is configured to remove a portion of the joint from the joining region.

14. The metal joiner of claim 10, wherein the metal joiner further comprises a cleaning header configured to direct a cleaning force onto the joining region and apply a suction force onto the joining region ahead of the first laser beam in a direction of travel.

15. A method comprising:
aligning an end edge of a first metal substrate with a start edge of a second metal substrate such that an edge surface of the end edge abuts and is in contact with an edge surface of the start edge, wherein the aligned end edge and start edge define a joining region;
preparing the joining region for joining by directing a first laser beam onto the joining region with a cutting header of a metal joiner and cutting through an entire thickness of the joining region, thereby forming a gap in the joining region extending through the entire thickness of the joining region; and
directing a second laser beam onto the joining region with a joining header of a metal joiner to form a weld, wherein forming the weld joins the first metal substrate with the second metal substrate.

16. The method of claim 15, wherein a width of the gap is less than 0.5 mm.

17. The method of claim 15, wherein preparing the joining region comprises at least one of: removing a contaminant from the joining region with a cleaning header; or removing a contaminant from the joining region with the first laser beam.

18. The method of claim 15, wherein forming the weld comprises forming a weld having a weld thickness that is either:
less than a thickness of the first metal substrate and less than a thickness of the second metal substrate; or
extends beyond a top surface of the first metal substrate and beyond a top surface of the second metal substrate by less than 0.2 mm or 10% of thickness of both the first metal substrate and the second metal substrate.

19. The method of claim 15, further comprising directing a joint finisher to remove a portion of the weld at one or more of a weld start, a weld crater, or weld defects.

* * * * *